US012655716B2

(12) United States Patent
Giordano

(10) Patent No.: US 12,655,716 B2
(45) Date of Patent: Jun. 16, 2026

(54) SUBSEA COMPLETION ANNULUS PRESSURE COMPENSATION SYSTEM

(71) Applicant: Chevron U.S.A. Inc., San Ramon, CA (US)

(72) Inventor: Michael Anthony Giordano, Houston, TX (US)

(73) Assignee: CHEVRON U.S.A. INC., San Ramon, CA (US)

(*) Notice: Subject to any disclaimer, the term of this patent is extended or adjusted under 35 U.S.C. 154(b) by 0 days.

(21) Appl. No.: 18/946,548

(22) Filed: Nov. 13, 2024

(65) Prior Publication Data

US 2026/0132698 A1 May 14, 2026

(51) Int. Cl.
*E21B 34/06* (2006.01)
*E21B 33/035* (2006.01)
*F15B 1/04* (2006.01)

(52) U.S. Cl.
CPC ............ *E21B 34/06* (2013.01); *E21B 33/035* (2013.01); *F15B 1/04* (2013.01)

(58) Field of Classification Search
CPC ......... E21B 34/06; E21B 33/035; F15B 11/04
See application file for complete search history.

(56) References Cited

U.S. PATENT DOCUMENTS 10,844,693 B2 11/2020 Douglas et al.
2003/0116969 A1* 6/2003 Skinner ............... E21B 41/0085 290/1 R
2010/0186960 A1* 7/2010 Reitsma ................ E21B 21/106 166/305.1
2013/0062056 A1* 3/2013 Broussard ............. E21B 47/001 166/250.15
2015/0322978 A1* 11/2015 Gamble .............. E21B 33/0355 60/325
2017/0037848 A1* 2/2017 Robison .................. F04B 23/00
2017/0167224 A1* 6/2017 Holder .................. E21B 34/066
2017/0328155 A1* 11/2017 Richards ............... E21B 21/103
2019/0153821 A1* 5/2019 Douglas .................. E21B 43/12
2020/0190948 A1* 6/2020 Chitwood ............... E21B 36/04
2021/0332652 A1* 10/2021 Muraikhi ................ E21B 47/06
2024/0102358 A1* 3/2024 Murtaza .................. E21B 36/00
2024/0328290 A1* 10/2024 Ciufu ...................... E21B 47/06

* cited by examiner

*Primary Examiner* — Taras P Bemko
(74) *Attorney, Agent, or Firm* — Smith & Woldesenbet Law Group, PLLC

(57) ABSTRACT

A system for self-regulating pressure within an annulus of a subsea wellbore includes an accumulator and piping. The accumulator includes a first compartment having an annulus fluid, a second compartment comprising a regulating fluid, and a fluidic barrier movably disposed between the first compartment and the second compartment. The first end of the piping penetrates an aperture in a subsea wellhead and terminates in the annulus of the subsea wellbore, and the second end of the piping terminates in the first compartment of the accumulator. The annulus fluid flows into and expands a size of the first compartment by moving the fluidic barrier toward the second compartment to reduce a pressure in the annulus, and the annulus fluid flows out of the first compartment to increase the pressure in the annulus when the regulating fluid forces the fluidic barrier toward the second end of the piping.

20 Claims, 7 Drawing Sheets

SUBSEA COMPLETION ANNULUS PRESSURE COMPENSATION SYSTEM

TECHNICAL FIELD

The present application is related to subterranean field operations and, more particularly, to systems and methods for compensating for a subsea completion annulus.

BACKGROUND

Subsea wells are subjected to large increases and decreases in annulus pressure (e.g., the “A” annulus or A-annulus, the “B” annulus or B-annulus, the “C” annulus or C-annulus, the “D” annulus or D-annulus) throughout the life (e.g., production, injection) of the wellbore. For production wells, the pressure in the annulus builds as the well is unloaded and brought to full production rates. As a result, the annulus pressure is often bled off to prevent failure in the tubing, the casing, and/or the packers. As this cycling of pressure in the annulus occurs, it puts a variable load on the equipment in the wellbore, causing increased seal movement, fatigue, and in some cases pre-mature failure in some or all components. For injection wells, as they are brought online, due to the cooling effeet of the injection fluid, the annulus pressure decreases, increasing loads and stress on the completion equipment. In some cases, for injection wells, the annulus pressure falls to zero, making it difficult to interpret if the tubing and/or packer is maintaining integrity. Also, in some cases, when an injection well is shut-in, the annulus pressure may build due to the increasing temperature and may require bleed offs (e.g., through the XT annulus access line) to ensure that the pressure in the annulus does not exceed allowable limits. This subjects the casing and completion components to high stresses, thereby reducing the life of the wellbore and requiring frequent human intervention.

SUMMARY

In general, in one aspect, the disclosure relates to a system for self-regulating pressure within an annulus of a subsea wellbore. The system can include an accumulator and piping. The accumulator of the system can include an annulus fluid chamber having an annulus fluid having a first pressure at a first time. The accumulator of the system can also include a regulating fluid chamber having a regulating fluid having a second pressure at the first time. The accumulator of the system can further include a fluidic barrier movably disposed between the annulus fluid chamber and the regulating fluid chamber. The piping of the system has a first end and a second end, where the first end penetrates an aperture in a subsea wellhead and terminates in the annulus of the subsea wellbore, and where the second end terminates in the annulus fluid chamber of the accumulator. The fluidic barrier can move to increase a first size of the annulus fluid chamber and decrease a second size of the regulating fluid chamber at a second time when the first pressure exceeds the second pressure by a first threshold value. The fluidic barrier can move to decrease the first size of the annulus fluid chamber and increase the second size of the regulating fluid chamber at the second time when the second pressure exceeds the first pressure by a second threshold value. Increasing the first size of the annulus fluid chamber at the second time can reduce pressure in the annulus of the subsea wellbore by allowing annulus fluid to flow from the annulus to the annulus fluid chamber through the piping. Decreasing the first size of the annulus fluid chamber at the second time can increase pressure in the annulus of the subsea wellbore by allowing annulus fluid to flow from the annulus fluid chamber to the annulus through the piping.

In another aspect, the disclosure relates to a method for self-regulating pressure within an annulus of a subterranean wellbore. The method can include positioning an accumulator proximate to a subsea wellhead at the entry point of a subterranean wellbore, where the accumulator includes an annulus fluid chamber having an annulus fluid, a regulating fluid chamber having a regulating fluid, and a fluidic barrier movably disposed between the annulus fluid chamber and the regulating fluid chamber. The method can also include installing piping between the annulus fluid chamber of the accumulator and the annulus of the subterranean wellbore. The fluidic barrier can move to increase a first size of the annulus fluid chamber and decrease a second size of the regulating fluid chamber at a second time when the first pressure exceeds the second pressure by a first threshold value. The fluidic barrier can move to decrease the first size of the annulus fluid chamber and increase the second size of the regulating fluid chamber at the second time when the second pressure exceeds the first pressure by a second threshold value. Increasing the first size of the annulus fluid chamber at the second time can reduce pressure in the annulus of the subsea wellbore by allowing annulus fluid to flow from the annulus to the annulus fluid chamber through the piping. Decreasing the first size of the annulus fluid chamber at the second time can increase pressure in the annulus of the subsea wellbore by allowing annulus fluid to flow from the annulus fluid chamber to the annulus through the piping.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DESCRIPTION OF THE INVENTION

Figure 1:
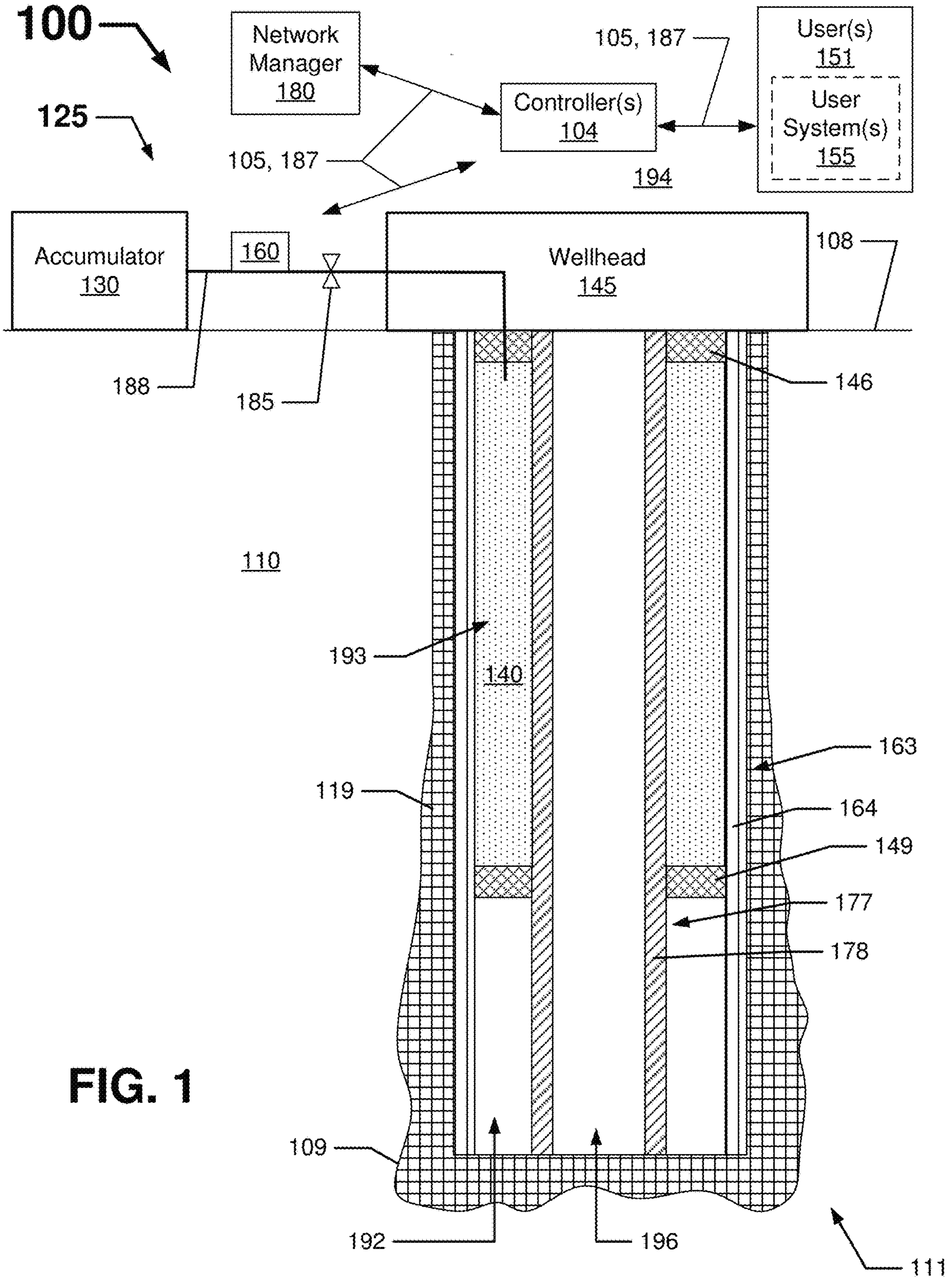
FIG. 1 shows a field system that includes an example self-regulating annulus pressure system according to certain example embodiments.

The example embodiments discussed herein are directed to systems, methods, and devices for providing for subsea completion annulus pressure compensation. Wellbores for which example embodiments are used can be drilled and completed to extract a subterranean resource from a subterranean formation and/or to inject a fluid into a subterranean formation. Examples of a subterranean resource can include, but are not limited to, natural gas, oil, and water. Wellbores for which example embodiments are used can be subsea or land-based. Example embodiments can be rated for use in marine and/or hazardous environments. The wellbores for which example embodiments are used can be production wells and/or injection wells.

Example embodiments can include multiple components that are described herein, where a component can be made from a single piece (as from a mold or an extrusion). When a component (or portion thereof) of an example embodiment for providing for subsea completion annulus pressure compensation is made from a single piece, the single piece can be cut out, bent, stamped, and/or otherwise shaped to create certain features, elements, or other portions of the component. Alternatively, a component (or portion thereof) of an example embodiment for providing for subsea completion annulus pressure compensation can be made from multiple pieces that are mechanically coupled to each other. In such a case, the multiple pieces can be mechanically coupled to each other using one or more of a number of coupling methods, including but not limited to adhesives, welding, fastening devices, compression fittings, mating threads, and slotted fittings. One or more pieces that are mechanically coupled to each other can be coupled to each other in one or more of a number of ways, including but not limited to fixedly, hingedly, rotatably, removably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, abut against, fasten, and/or perform other functions aside from merely coupling. In addition, each component and/or feature described herein (including each component of an example system for providing for subsea completion annulus pressure compensation) can be made of one or more of a number of suitable materials, including but not limited to metal (e.g., stainless steel), ceramic, rubber, glass, and plastic.

A coupling feature (including a complementary coupling feature) as described herein can allow one or more components (e.g., a housing) and/or portions of an example embodiment for providing for subsea completion annulus pressure compensation to become mechanically coupled, directly or indirectly, to another portion of the example embodiment for providing for subsea completion annulus pressure compensation and/or a component of a larger system. A coupling feature can include, but is not limited to, a portion of mating threads, a hinge, an aperture, a recessed area, a protrusion, a slot, and a detent. One portion of an example system for providing for subsea completion annulus pressure compensation can be coupled to another portion of the example embodiment of a system for providing for subsea completion annulus pressure compensation and/or a component of a larger system by the direct use of one or more coupling features.

In addition, or in the alternative, a portion of an example embodiment for providing for subsea completion annulus pressure compensation can be coupled to another portion of the example embodiment for providing for subsea completion annulus pressure compensation and/or a component of a larger system using one or more independent devices that interact with one or more coupling features disposed on a component of the example embodiment for providing for subsea completion annulus pressure compensation. Examples of such devices can include, but are not limited to, a fastening device (e.g., a bolt, a screw, a rivet), a pin, a hinge, an adapter, and a spring. One coupling feature described herein can be the same as, or different than, one or more other coupling features described herein. A complementary coupling feature as described herein can be a coupling feature that mechanically couples, directly or indirectly, with another coupling feature.

When used in certain environments (e.g., for certain subterranean field operations), example embodiments can be designed to help such systems comply with certain standards and/or requirements. Examples of entities that set such standards and/or requirements can include, but are not limited to, the Society of Petroleum Engineers, the American Petroleum Institute (API), the International Standards Organization (ISO), and the Occupational Safety and Health Administration (OSHA). Also, as discussed above, example embodiments for providing for subsea completion annulus pressure compensation can be used in marine and/or hazardous environments, and so example embodiments for providing for subsea completion annulus pressure compensation can be designed to comply with industry standards that apply to marine and/or hazardous environments.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if an item is described herein as including a component of type A, a component of type B, a component of type C, or any combination thereof, it is understood that this phrase describes all of the various individual and collective combinations and permutations of these components.

For example, in some embodiments, the item described by this phrase could include only a component of type A. In some embodiments, the item described by this phrase could include only a component of type B. In some embodiments, the item described by this phrase could include only a component of type C. In some embodiments, the item described by this phrase could include a component of type A and a component of type B. In some embodiments, the item described by this phrase could include a component of type A and a component of type C. In some embodiments, the item described by this phrase could include a component of type B and a component of type C.

In some embodiments, the item described by this phrase could include a component of type A, a component of type B, and a component of type C. In some embodiments, the item described by this phrase could include two or more components of type A (e.g., A1 and A2). In some embodiments, the item described by this phrase could include two or more components of type B (e.g., B1 and B2). In some embodiments, the item described by this phrase could include two or more components of type C (e.g., C1 and C2). In some embodiments, the item described by this phrase could include two or more of a first component (e.g., two or more components of type A (A1 and A2)), optionally one or more of a second component (e.g., optionally one or more components of type B), and optionally one or more of a third component (e.g., optionally one or more components of type C).

In some embodiments, the item described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the item described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit number or a four-digit number, and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments for providing for subsea completion annulus pressure compensation will be described more fully hereinafter with reference to the accompanying drawings, in which example embodiments for providing for subsea completion annulus pressure compensation are shown. Example embodiments for providing for subsea completion annulus pressure compensation may, however, be embodied in many different forms and should not be construed as limited to the example embodiments set forth herein. Rather, these example embodiments are provided so that this disclosure will be thorough and complete, and will fully convey the scope of providing for subsea completion annulus pressure compensation to those of ordinary skill in the art. Like, but not necessarily the same, elements (also sometimes called components) in the various figures are denoted by like reference numerals for consistency.

Terms such as “first”, “second”, “primary,” “secondary,” “above”, “below”, “inner”, “outer”, “distal”, “proximal”, “end”, “top”, “bottom”, “upper”, “lower”, “side”, “left”, “right”, “front”, “rear”, and “within”, when present, are used merely to distinguish one component (or part of a component or state of a component) from another. This list of terms is not exclusive. Such terms are not meant to denote a preference or a particular orientation, and they are not meant to limit embodiments of providing for subsea completion annulus pressure compensation. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a field system 100 that includes an example self-regulating annulus pressure system 125 according to certain example embodiments. The components shown in FIG. 1 are not exhaustive, and in some embodiments, one or more of the components shown in FIG. 1 may not be included in the example field system 100. Any component of the field system 100 may be discrete or combined with one or more other components of the field system 100. Also, one or more components of the field system 100 may have different configurations. For example, a controller 104 may be combined with the accumulator 130 into a single component. As another example, one or more of the sensor devices may be disposed within or disposed on the example self-regulating annulus pressure system 125 and/or other components (e.g., a valve of the wellhead 145) of the field system 100.

The field system 100 of FIG. 1 shows a wellbore 111 drilled into a subterranean formation 110. The wellbore 111 is defined by a wall 109. The wellbore 111 is drilled using a rig (e.g., a derrick, a tool pusher, a clamp, a tong) and field equipment (e.g., drill pipe, casing pipe, a drill bit, a fluid pumping system). Some of this field equipment is located above (e.g., at, near) the ground 108 (e.g., a seabed for subsea operations, dry land for land-based operations), and other parts of the field equipment is located within the wellbore 111 as the wellbore 111 is developed. For example, the field system 100 of FIG. 1 shows a casing string 163 is positioned within the wellbore 111 and set against the wall 109 of the wellbore 111 with cement 119. Specifically, once the wellbore 111 (or a section thereof) is drilled, the casing string 163 is inserted into the wellbore 111 and subsequently cemented to the wall 109 of the wellbore 111 to stabilize the wellbore 111 and allow for the extraction of subterranean resources (e.g., oil, natural gas) from the subterranean formation 110.

The point where the wellbore 111 begins at the ground 108 can be called the entry point. While not shown in FIG. 1, there can be multiple wellbores 111, each with their own entry point but that are located close to the other entry points, drilled into the subterranean formation 110. In such a case, the multiple wellbores 111 can be drilled at the same pad location using the same rig and, in some cases, at least some of the same field equipment. For subsea operations, as in this example, the ground 108 may be some distance (e.g., hundreds of feet, thousands of feet, miles) below the water line.

The subterranean formation 110 can include one or more of a number of formation types, including but not limited to shale, limestone, sandstone, clay, sand, and salt. In certain embodiments, a subterranean formation 110 can include one or more reservoirs in which one or more subterranean resources (e.g., oil, gas, water, steam) can be located and extracted through the wellbore 111. In addition, or in the alternative, some parts of the subterranean formation 110 may have gaps or caverns into which a fluid may be injected through the wellbore 111. One or more of a number of field operations (e.g., fracturing, coring, tripping, drilling, cementing casing, injecting, extracting downhole resources) can be performed to reach an objective of a user with respect to the subterranean formation 110.

The wellbore 111 can have one or more of a number of segments, where each segment can have one or more of a number of dimensions. Examples of such dimensions can include, but are not limited to, a size (e.g., diameter) of the wellbore 111, a curvature of the wellbore 111, a true vertical depth of the wellbore 111, a measured depth of the wellbore 111, and a horizontal displacement of the wellbore 111. In some cases, not shown in FIG. 1, the wellbore 111 can undergo multiple cementing operations, where each cementing operation covers part or all of a segment of the wellbore 111 or multiple segments of the wellbore 111 using a progressively smaller outer diameter casing string 163. A segment of the wellbore 111 may be substantially vertical, substantially horizontal, and/or somewhere in between. A segment of the wellbore 111 may be substantially linear and/or have a curvature.

Each end of a casing pipe 164 has mating threads (a type of coupling feature) disposed thereon, allowing a casing pipe 164 to be mechanically coupled to another casing pipe 164 in an end-to-end configuration. The casing pipes 164 of the casing string 163 can be mechanically coupled to each other directly or indirectly using a coupling device, such as a coupling sleeve. Each casing pipe 164 of the casing string 163 can have a length and a width (e.g., inner diameter, outer diameter). The length of a casing pipe 164 can vary. For example, a common length of a casing pipe 164 is approximately 40 feet. The length of a casing pipe 164 can be longer (e.g., 60 feet) or shorter (e.g., 10 feet) than 40 feet. The width of a casing pipe 164 can also vary and can depend on the cross-sectional shape of the casing pipe 164. For example, when the cross-sectional shape of a casing pipe 164 is circular, which is commonly the case, the width can refer to an outer diameter, an inner diameter, or some other form of measurement of the casing pipe 164. Examples of a width in terms of an outer diameter of a casing pipe 164 can include, but are not limited to, 4-½ inches, 7 inches, 7⅝ inches, 8⅝ inches, 10-¾ inches, 13-⅜ inches, and 14 inches. Typically, as in this case, the larger widths of the casing pipe 164 (as for casing string 163) are closer to the entry point at the ground 108, and the width gradually decreases by segment moving toward the distal end of the wellbore 111.

The size (e.g., width, length) of a casing string 163 can be based on the information gathered using field equipment with respect to the subterranean wellbore 111. As discussed above, the walls of the casing pipes 164 of the casing string 163 have an inner surface that form a cavity that traverses the length of the casing string 163. Each casing pipe 164 of the casing string 163 can be made of one or more of a number of suitable materials, including but not limited to stainless steel.

In addition, a tubing string 177 is positioned within the wellbore 111 inside of the casing string 163. The space between the tubing string 177 and the casing string 163 in the wellbore 111 is the annulus 192. The tubing string 177 include a number of tubing string components 178 that are coupled to each other end-to-end to form the tubing string 177. Examples of a tubing string component 178 may include tubing pipes, tools, subs, coupling sleeves, and collars. Each end of a tubing string component 178 has mating threads (a type of coupling feature) disposed thereon, allowing the tubing string component 178 to be mechanically coupled to another tubing string component 178 in an end-to-end configuration. The tubing string 177 has a cavity 196 along its length.

In most cases, the majority of tubing string components 178 of the tubing string 177 are in the form of a tubing pipe. Each tubing pipe of the tubing string 177 can have a length and a width (e.g., outer diameter). The length of a tubing pipe can vary. For example, a common length of a tubing pipe is approximately 30 feet. The length of a tubing pipe can be longer (e.g., 60 feet) or shorter (e.g., 10 feet) than 30 feet. The width of a tubing pipe can also vary and can depend on the cross-sectional shape of the tubing pipe. For example, when the cross-sectional shape of a tubing pipe is circular, which is commonly the case, the width can refer to an outer diameter, an inner diameter, or some other form of measurement of the tubing pipe. Examples of a width in terms of an outer diameter of a tubing pipe can include, but are not limited to, 4½ inches, 7 inches, 7⅝ inches, 8⅝ inches, and 10-¾ inches. The outer diameter of the tubing string 177 is less than the inner diameter of the casing string 163 at a given depth along the entirety of the wellbore 111.

Within a portion 193 of the annulus 192 in the wellbore 111 is an annulus fluid 140 (sometimes referred to by other names such as a packer fluid). In some cases, the annulus fluid 140 is or includes a brine. The portion 193 is located at the top end of the annulus 192 and is isolated within the annulus 192 by a packer 149 that generates a fluidic seal between the casing string 163 and the tubing string 177 in the wellbore 111. At the top end of the portion 193, the annulus fluid 140 is enclosed by a component 146 (e.g., another packer, a tubing hanger) of the wellhead 145, which also creates a fluidic seal with the tubing string 177 and the casing string 163.

This arrangement puts means that the portion 193 is a constant volume space within the annulus 192. The energy of the fluid running through the cavity 196 in the tubing string 177 is partially transferred to the thermally conductive tubing string 177, which in turn transfers the energy to the annulus fluid 140 in the portion 193 of the annulus 192. When the energy transferred is heat energy (e.g., as is common during production operations with respect to the wellbore 111), the transferred heat energy results in increasing the pressure within the portion 193 of the annulus 192 because the heat causes the annulus fluid 140 contained therein to expand and because the volume of the portion 193 is fixed.

Conversely, when the energy transferred is cold energy (e.g., as is common during injection operations with respect to the wellbore 111), the transferred cold energy results in decreasing the pressure within the portion 193 of the annulus 192 because the cold causes the annulus fluid 140 contained therein to contract and because the volume of the portion 193 is fixed. When these pressure swings (whether increases in pressure or decreases in pressure) reach threshold levels, damage within the wellbore 111 may occur. For example, the tubing string 177 may bend, break, burst, collapse, and/or otherwise fail. As another example, the packer 149 may become damaged and lose its ability to keep a fluidic seal. As yet another example, the casing string 163 may bend, break, burst, collapse, and/or otherwise fail. As still another example, one or more components (e.g., component 146) of the wellhead 145 may fail. Any of these circumstances, if severe enough, may compromise the wellbore 111 and/or the field operations.

The field system 100 also includes a wellhead 145 that is mounted on the ground 108 at the entry point (e.g., atop a wellhead) of the wellbore 111. The wellhead 145 is an assembly of components (e.g., seals, valves (e.g., similar to the valves 185 discussed below), spools, pressure gauges, chokes, hangers). The wellhead 145 is configured to provide a structural and pressure-controlled interface between the wellbore 111 and drilling, injection, and/or production equipment. In some cases, the wellhead 145 may include one or more of a number of other components, including but not limited to one or more controllers (e.g., similar to the controllers 104 discussed below), one or more power sources, one or more motors, and one or more sensor devices (e.g., similar to the sensor devices 160 discussed below). In some cases, a wellhead 145 is or includes a subsea Xmas tree.

A user 151 may be any person that interacts, directly or indirectly, with a controller 104, any other part of the self-regulating annulus pressure system 125, and/or any other component of the field system 100. Examples of a user 151 may include, but are not limited to, a business owner, an engineer (e.g., a production engineer), a company representative, a geologist, a consultant, a drilling engineer, a contractor, a manufacturer's representative, and an operator. A user 151 may use one or more user systems 155, which may include a display (e.g., a GUI). A user system 155 of a user 151 may interact with (e.g., send data to, obtain data from) a controller (e.g., a controller 104 of the self-regulating annulus pressure system 125, some other controller of the field system 100) via an application interface and using communication links 105 (discussed below). A user 151 may also interact directly with a controller 104 through a user interface (e.g., keyboard, mouse, touchscreen). Examples of a user system 155 may include, but are not limited to, a cell phone, a smart phone, a desktop computer, a laptop computer, a tablet, and a handheld electronic device.

The network manager 180 is a device or component that controls all or a portion (e.g., a communication network, a controller 104) of the field system 100 or portions thereof including one or more components of the self-regulating annulus pressure system 125. The network manager 180 may be substantially similar to some or all of a controller 104, as described above. For example, the network manager 180 may include a controller that has one or more components and/or similar functionality to some or all of a controller 104. Alternatively, the network manager 180 may include one or more of a number of features in addition to, or altered from, the features of a controller 104. As described herein, control and/or communication with the network manager 180 may include communicating with one or more other components of the field system 100 (including one or more components of the self-regulating annulus pressure system 125) and/or another system. In such a case, the network manager 180 may facilitate such control and/or communication. The network manager 180 may be called by other names, including but not limited to a master controller, a network controller, and an enterprise manager. The network manager 180 may be considered a type of computer device, as discussed below with respect to FIG. 8.

The example self-regulating annulus pressure system 125 of the field system 100 is configured to automatically regulate the pressure within the portion 193 of the annulus 192 of the wellbore 111. The self-regulating annulus pressure system 125 may include one or more of any of a number of components. Examples of such components may include one or more sensor devices 160, one or more controllers 104, one or more valves 185, piping 188, and an accumulator 130.

Each sensor device 160 of the self-regulating annulus pressure system 125 includes one or more sensors that measure one or more parameters (e.g., temperature, pressure, flow rate, proximity, fluid content) associated with one or more of the fluids (e.g., the annulus fluid, the regulating fluid). Examples of a sensor of a sensor device 160 may include, but are not limited to, a temperature sensor, a flow sensor, a pressure sensor, a gas spectrometer, a spectrograph, a gas chromatograph, and a camera. A sensor device 160 may be a stand-alone device or integrated with another component (e.g., a controller 104) of the self-regulating annulus pressure system 125. A sensor device 160 may take measurements continuously (e.g., over a period of time, at all times), in discrete increments (e.g., every 5 minutes, every hour), on demand (e.g., based on instructions from a controller 104, based on the occurrence of an event), and/or based on some other factor.

In some cases, a number of sensor devices 160, each measuring a different parameter or the same parameter at a different location, may be used in combination to determine and confirm whether a controller 104 should take a particular action (e.g., operate a valve, send a notification about the integrity of the accumulator 130, send a notification about the integrity of the piping 188). A controller 104 of the self-regulating annulus pressure system 125 may be configured to correlate the measurements made by one or more sensor devices 160 by time. In such a case, a controller 104 may further be configured to generate a baseline (e.g., of pressure of the annulus fluid, of temperature of the annulus fluid, of a position of the fluidic barrier (discussed below) in the accumulator 130) of some or all of the self-regulating annulus pressure system 125 over periods of time. When a sensor device 160 includes its own controller (or portions thereof), similar to a controller 104, then the sensor device 160 may be considered a type of computer device, as discussed below with respect to FIG. 8.

The piping 188 of the self-regulating annulus pressure system 125 may include multiple pipes, ducts, elbows, joints, sleeves, collars, and similar components that are coupled to each other (e.g., using coupling features such as mating threads) to establish a network for transporting the annulus fluid 140 within the self-regulating annulus pressure system 125 and/or to the portion 193 of the annulus 192. Each component of the piping 188 of the self-regulating annulus pressure system 125 may have an appropriate size (e.g., inner diameter, outer diameter) and be made of an appropriate material (e.g., steel, stainless steel, inconel, PVC) to safely and efficiently handle the pressure, temperature, flow rate, and other characteristics of the annulus fluid 140 that flow therethrough.

In this case, one end (e.g., the distal end) of the piping 188 penetrates a wall in the accumulator 130. For example, one end of the piping 188 may terminate in an annulus fluid chamber (discussed below with respect to FIGS. 2A through 3) of the accumulator 130. The other end (e.g., the proximal end) of the piping 188 penetrates an aperture in the subsea wellhead 145 and terminates in the portion 193 of the annulus 192 in the wellbore 111. In this example, the end of the piping 188 penetrates an aperture in the component 146 (e.g., a tubing hanger) of the wellhead 145. In some cases, the piping 188 extends through an existing aperture or channel in the component 146 and/or other portions of the wellhead 145 so that no modifications to existing equipment is needed to accommodate the piping 188 according to certain example embodiments. In other words, the component 146 and/or other portions of the wellhead 145 are unaltered from their original design when used with example embodiments.

There may be a number of valves 185 placed directly or indirectly in-line with the piping 188 (or portions thereof) at various locations in the self-regulating annulus pressure system 125 to control the flow of the annulus fluid 140 between the accumulator 130 and the portion 193 of the annulus 192 in the wellbore 111. A valve 185 may have one or more of any of a number of configurations, including but not limited to a guillotine valve, a ball valve, a gate valve, a butterfly valve, a pinch valve, a needle valve, a plug valve, a diaphragm valve, and a globe valve. One valve 185 may be configured the same as or differently compared to another valve 185 in the self-regulating annulus pressure system 125. Also, one valve 185 may be controlled (e.g., manually by a user 151, automatically by a controller 104 of the self-regulating annulus pressure system 125) the same as or differently compared to another valve 185 in the self-regulating annulus pressure system 125.

The accumulator 130 of the self-regulating annulus pressure system 125 performs the automatic regulation of the pressure in the portion 193 of the annulus 192. The accumulator 130 has a compartment that contains some of the annulus fluid 140 and another compartment that contains a regulating fluid (e.g., the water 194). The accumulator 130 also includes a fluidic barrier between those compartments. More details about and examples of the accumulator 130 are provided below with respect to FIGS. 2 and 3.

Interaction between each controller 104, the sensor devices 160, the users 151 (including any associated user systems 155), the network manager 180, and other components (e.g., the valves) of the field system 100, including other components of the self-regulating annulus pressure system 125, may be conducted using communication links 105 and/or power transfer links 187. Each communication link 105 is configured to transfer communication signals (e.g., commands, instructions, data, identification) between components of the field system 100 (including components of the self-regulating annulus pressure system 125. Each communication link 105 may include wired (e.g., Class 1 electrical cables, electrical connectors, Power Line Carrier, RS485) and/or wireless (e.g., sound or pressure waves in the annulus fluid 140 in the annulus 192, Wi-Fi, Zigbee, visible light communication, cellular networking, Bluetooth, Bluetooth Low Energy (BLE), ultrawide band (UWB), WirelessHART, ISA100) technology.

Each power transfer link 187 is configured to transfer power between components of the field system 100 (including components of the self-regulating annulus pressure system 125. Each power transfer link 187 may include one or more electrical conductors, which may be individual or part of one or more electrical cables. In some cases, as with inductive power, power may be transferred wirelessly using power transfer links 187. A power transfer link 187 may transmit power from one component (e.g., a power source) of the field system 100 to another (e.g., a valve 185). Each power transfer link 187 may be sized (e.g., 12 gauge, 18 gauge, 4 gauge) in a manner suitable for the amount (e.g., 480V, 24V, 120V) and type (e.g., alternating current, direct current) of power transferred therethrough.

A controller 104 of the self-regulating annulus pressure system 125 is configured to communicate with and in some cases control one or more of the other components (e.g., a sensor device 160, a valve, another controller 104) of the self-regulating annulus pressure system 125. A controller 104 performs any of a number of functions that include, but are not limited to, obtaining and sending data, evaluating data, following protocols, running algorithms, and sending commands.

A controller 104 may include one or more of a number of components. For example, such components of a controller 104 may include, but are not limited to, a control engine, an evaluation module, a sensor device performance module, a communication module, a timer, a power module, a storage repository (e.g., protocols, algorithms, stored data), a hardware processor, a memory, a transceiver, an application interface, and a security module. A controller 104 (or components thereof) may be located at or near the various components of the self-regulating annulus pressure system 125 or other components of the field system 100. In addition, or in the alternative, a controller 104 (or components thereof) may be located remotely from (e.g., in the cloud, at an office building) the various components of the self-regulating annulus pressure system 125 or other components of the field system 100.

When there are multiple controllers 104 (e.g., one controller 104 for one or more of the sensor devices 160, another controller 104 for one or more valves 185) for the self-regulating annulus pressure system 125, each controller 104 may operate independently of each other. Alternatively, two or more of the multiple controllers 104 may work cooperatively with each other. As yet another alternative, one of the controllers 104 may control some or all of one or more other controllers 104 in the self-regulating annulus pressure system 125 and/or other parts of the field system 100. Each controller 104 may be configured to operate in real time. Each controller 104 may be considered a type of computer device, as discussed below with respect to FIG. 8.

The various components of a controller 104 (e.g., control engine, transceiver, communication module, storage repository) may be centrally located. In addition, or in the alternative, some of the components of a controller 104 may be located remotely from (e.g., in the cloud, at an office building, on a vessel floating in water 194 above the wellbore 111) one or more of the other components of the controller 104.

The storage repository of a controller 104 may be a persistent storage device (or set of devices) that stores software and data used to assist the controller 104 in communicating with one or more other components of the self-regulating annulus pressure system 125 and/or other parts of the field system 100, such as the users 151 (including associated user systems 155), the network manager 180, the other controllers 104 of the self-regulating annulus pressure system 125, the sensor devices 160, the valves 185, and/or any other components of the field system 100, including the self-regulating annulus pressure system 125. In one or more example embodiments, the storage repository stores one or more protocols, one or more algorithms, and stored data.

Stored data of the storage repository of a controller 104 may be any data associated with the various equipment (e.g., the valves 185, the piping 188, the controllers 104, the sensor devices 160, the accumulator 130), including associated components, of the self-regulating annulus pressure system 125, the user systems 155, the network manager 180, other controllers, other sensor devices outside the field system 100, measurements made by the sensor devices 160, threshold values, ranges of acceptable values, tables (e.g., lookup tables), results of previously run or calculated algorithms, updates to protocols and/or algorithms, user preferences, and/or any other suitable data. Such data may be any type of data, including but not limited to historical data, present data, and future data (e.g., forecasts). The stored data may be associated with some measurement of time derived, for example, from a timer of a controller 104.

The protocols of the storage repository of a controller 104 may be any procedures (e.g., a series of method steps) and/or other similar operational processes that the control engine of the controller 104 follows based on certain conditions at a point in time. The protocols may include any of a number of communication protocols that are used to send and/or obtain data between the controller 104, other components of the self-regulating annulus pressure system 125, and/or other parts of the field system 100. Such protocols used for communication may be a time-synchronized protocol. Examples of such time-synchronized protocols may include, but are not limited to, a highway addressable remote transducer (HART) protocol, a wirelessHART protocol, and an International Society of Automation (ISA) 100 protocol. In this way, one or more of the protocols may provide a layer of security to the data transferred within the field system 100. Other protocols used for communication may be associated with the use of Wi-Fi, Zigbee, visible light communication (VLC), cellular networking, BLE, UWB, and Bluetooth.

The algorithms may be or include any formulas, mathematical models, forecasts, simulations, and/or other similar tools that a component (e.g., the control engine, the evaluation module, the sensor device performance module) of a controller 104 uses to reach a computational conclusion. For example, one or more algorithms may be used, in conjunction with one or more protocols and stored data, to assist a controller 104 to obtain measurements of a parameter, made by one or more of the sensor devices 160, associated with the annulus fluid 140.

As another example, one or more algorithms may be used, in conjunction with one or more protocols and stored data, to assist a controller 104 to process (e.g., filter, format, group, average) the measurements obtained from one or more of the various sensor devices 160 to generate values associated with the measurements that may be used in subsequent analysis by the controller 104. As still another example, one or more algorithms may be used, in conjunction with one or more protocols and stored data, to assist a controller 104 to use the values associated with the measurements to generate a baseline of performance of one or more of the valves 185, the piping 188, the annulus fluid 140, and/or the fluidic barrier 235 of the accumulator 130 over periods of time (e.g., all time, when a field operation is in progress).

As another example, one or more algorithms may be used, in conjunction with one or more protocols and stored data, to assist a controller 104 to use the values associated with the measurements to evaluate the performance of the piping 188, the accumulator 130, and/or one or more of the sensor devices 160 at a point in time or over time. As yet another example, one or more algorithms may be used, in conjunction with one or more protocols and stored data, to assist a controller 104 to compare the subsequent measurements made by a sensor device 160 against expected values derived from a baseline or a range of acceptable values generated by the controller 104 for parameter associated with the annulus fluid. For example, such a comparison may include comparing the value of a pressure measurement to a range of acceptable values (e.g., stored data), where the range of acceptable values is established using the baseline.

As still another example, one or more algorithms may be used, in conjunction with one or more protocols and stored data, to assist a controller 104 to modify or establish an algorithm, a protocol, and/or stored data (e.g., a threshold value, an expected value) based on differences between expected values and actual values. As yet another example, one or more algorithms may be used, in conjunction with one or more protocols and stored data, to assist a controller 104 to determine that a problem is developing with the self-regulating annulus pressure system 125 (or portion thereof) when a difference between one of the measurements and one of the expected values falls outside a threshold value.

As still another example, one or more algorithms may be used, in conjunction with one or more protocols and stored data, to assist a controller 104 to operate a valve 185 (e.g., move to a fully closed position, move to a fully open position, move to 27% open, move to 38% closed) in real time. As yet another example, one or more algorithms may be used, in conjunction with one or more protocols and stored data, to assist a controller 104 to generate and send a communication, in real time, to a user 151 (including an associated user system 155) about a problem with the self-regulating annulus pressure system 125.

Stored data, one or more protocols, and/or one or more algorithms of a controller 104 may be or be based on machine learning and/or an analytical model. For example, the control engine of a controller 104, through the use of stored data, one or more protocols and/or one or more algorithms, may implement machine learning as a way to evolve over time with new data and associated changes that may result from the new data. The control engine may use, for example, supervised learning, unsupervised learning, semi-supervised learning, and/or reinforcement learning, as those terms are known in the art of machine learning. In this case, these types of machine learning are effective with sufficient data (e.g., measurements from sensor devices 160) and use of stored data, algorithms, and/or protocols that automatically build mathematical models using sample data—also known as “training data”.

In this way, for example, a controller 104 may measure and interpret the measurements of one or more parameters (e.g., temperature parameters, power parameters) associated with the annulus fluid 140 and/or operation of the self-regulating annulus pressure system 125 in order to establish baselines, compare subsequent data to baselines, adjust baselines, perform retroactive analysis, assess the portion 193 of the annulus 192 (including the performance of the self-regulating annulus pressure system 125), recommend a course of corrective action (e.g., change the position of a valve 185, install or activate a parallel self-regulating annulus pressure system 125, etc., using data and language elements native to the controller 104. Using this flexibility allowed by the learning protocols and/or algorithms, a controller 104 may scale to disparate vendor solutions and ‘build’ asset development optimization scenarios and recommendations. The learning protocols and/or algorithms may use or include large language models (LLM) to implement unique classification/semantic matching properties that may assist in the development of asset optimization by a controller 104.

The learning protocols and/or algorithms that may be used and trained by the control engine of a controller 104 may include, but are not limited to, instance-based learning algorithms, artificial neural network algorithms, deep learning algorithms, and ensemble algorithms. Instance-based learning algorithms typically build up a database of example data and compare new data to the database using a similarity measure in order to find the best match and make a prediction. For this reason, instance-based methods are also called winner-take-all methods and memory-based learning. Focus may be put on the representation of the stored instances and similarity measures used between instances. Instance-based algorithms may be computationally expensive for very large datasets since they save all training instances/data points and are sensitive to data noise.

Artificial neural networks may be fairly similar to the human brain. For example, artificial neural networks may be made up of artificial neurons, take in multiple inputs, and produce specific outputs. Artificial neural networks may be an enormous subfield comprised of a large number of neural network architectures and hundreds of algorithms and variations for different types of problems. Artificial neural networks may be biologically inspired computational simulations for certain specific tasks like clustering, classification, or pattern recognition.

Deep learning algorithms may be a modern update to artificial neural networks by building much larger and more complex neural networks. With deep learning, many methods may be applied to very large datasets. Various architectures may be applied for deep learning algorithms. Deep learning may have a high computational cost because much of its development requires advanced processing, storage hardware, and ML platforms/APIs.

Ensemble algorithm methods may be models composed of multiple weaker models that are independently trained and whose predictions are combined in some way to make the overall prediction. Various combination techniques (e.g., averaging, max voting, bagging/bootstrapping (sampling subsets of original complete dataset), boosting) may be applied. Unlike other standard ensemble methods where models are trained in isolation, the boosting technique may employ an iterative approach, training models in succession, with each new model being trained to correct the errors made by the previous ones. Models may be added sequentially until no further improvements may be made.

Examples of a storage repository of a controller 104 may include, but are not limited to, a database (or a number of databases), a file system, cloud-based storage, a hard drive, flash memory, some other form of solid-state data storage, or any suitable combination thereof. The storage repository of a controller 104 may be located on multiple physical machines, each storing all or a portion of the protocols, the algorithms, and/or the stored data according to some example embodiments. Each storage unit or device may be physically located in the same or in a different geographic location.

A controller 104 of the self-regulating annulus pressure system 125 is configured to identify anomalous behavior of one or more other components (e.g., a valve 185, the piping 188, a sensor device 160, the accumulator 130 of the self-regulating annulus pressure system 125, which may lead to pressure excursions (e.g., too high, too low) in the portion 193 of the annulus 192. The controller 104 may also be configured to generate and send a notification (e.g., to a user 151 via a user system 155) of the anomalous behavior. In some cases, the controller 104 may also be configured to adjust the position of one or more valves 185 in an attempt to bring the pressure within the portion 193 of the annulus 192 within an acceptable range of values.

A controller 104 of the self-regulating annulus pressure system 125 may also be configured to model the thermal behavior of the annulus fluid 140 in order to monitor and/or control one or more other components of the self-regulating annulus pressure system 125. Example embodiments may be configured to adopt machine learning methods to "learn" the relationship between various factors (e.g., time, pressure, temperature) associated with the annulus fluid 140 and/or the portion 193 of the annulus 192.

In one or more example embodiments, a controller 104 includes functionality to communicate with the users 151 (including associated user systems 155), the other controllers 104 of the self-regulating annulus pressure system 125, other controllers in the field system 100, the sensor devices 160 of the self-regulating annulus pressure system 125, other sensor devices in the field system 100, the network manager 180, and any other components in the field system 100 (including other components of the self-regulating annulus pressure system 125). More specifically, a controller 104 may be configured to send information to and/or obtains information from the storage repository of the controller 104 in order to communicate with the users 151 (including associated user systems 155), the other controllers 104 of the self-regulating annulus pressure system 125, other controllers in the field system 100, the sensor devices 160 of the self-regulating annulus pressure system 125, other sensor devices in the field system 100, the network manager 180, and any other components of the field system 100 (including other components of the self-regulating annulus pressure system 125).

A controller 104 may generate and process data associated with control, communication, and/or other signals sent to and obtained from the users 151 (including associated user systems 155), the other controllers 104 of the self-regulating annulus pressure system 125, other controllers in the field system 100, the sensor devices 160 of the self-regulating annulus pressure system 125, other sensor devices in the field system 100, the network manager 180, and any other components of the field system 100, including other components of the self-regulating annulus pressure system 125. In certain embodiments, a controller 104 may communicate with one or more components of a system external to the field system 100.

The timer of a controller 104 may track clock time, intervals of time, an amount of time, and/or any other measure of time. The timer of a controller 104 may also count the number of occurrences of an event, whether with or without respect to time. The timer of a controller 104 may be able to track multiple time measurements and/or count multiple occurrences concurrently. The timer of a controller 104 may track time periods based on a measurement obtained from a sensor device 160, based on an instruction obtained from a user 151, based on an instruction programmed in the software for the controller 104, based on some other condition (e.g., the occurrence of an event) or from some other component, or from any combination thereof. In certain example embodiments, the timer of a controller 104 may provide a time stamp for each packet of data obtained from another component (e.g., a sensor device 160) of the example field system 100, including the example self-regulating annulus pressure system 125.

A user 151 (including an associated user system 155), the other controllers (including the other controllers 104 of the self-regulating annulus pressure system 125), the sensor devices (including the sensor devices 160 of the self-regulating annulus pressure system 125), the network manager 180, and the other components of the field system 100, including other components of the self-regulating annulus pressure system 125, may interact with a controller 104 using an application interface of the controller 104. Examples of an application interface of a controller 104 may be or include, but are not limited to, an application programming interface, a web service, a data protocol adapter, some other hardware and/or software, or any suitable combination thereof. Similarly, the user systems 155 of the users 151, the other controllers (including the other controllers 104 of the self-regulating annulus pressure system 125), the sensor devices (including the sensor devices 160 of the self-regulating annulus pressure system 125), the network manager 180, and the other components of the field system 100, including other components of the self-regulating annulus pressure system 125, may include an interface (similar to the application interface of the controller 104) to obtain data from and send data to the controller 104 in certain example embodiments.

Figure 2A:
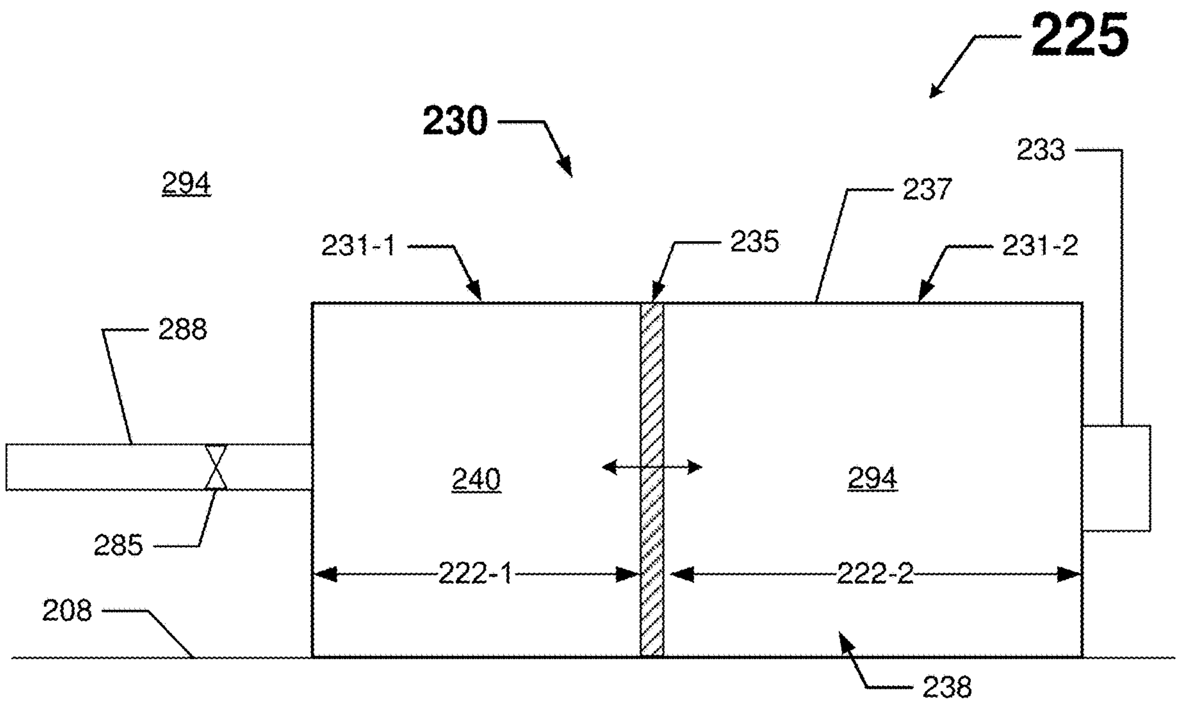
FIGS. 2A through 2C show various views of a block diagram of an example self-regulating annulus pressure system according to certain example embodiments.
Figure 2B:
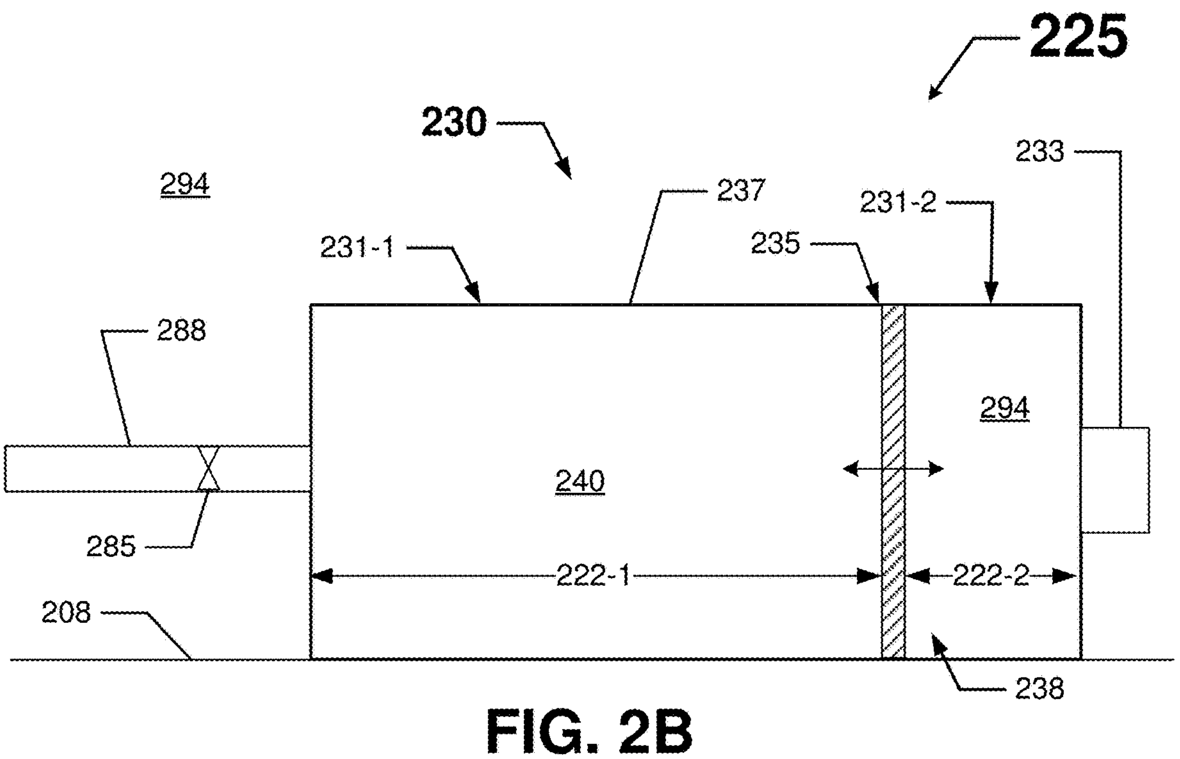
Figure 2C:
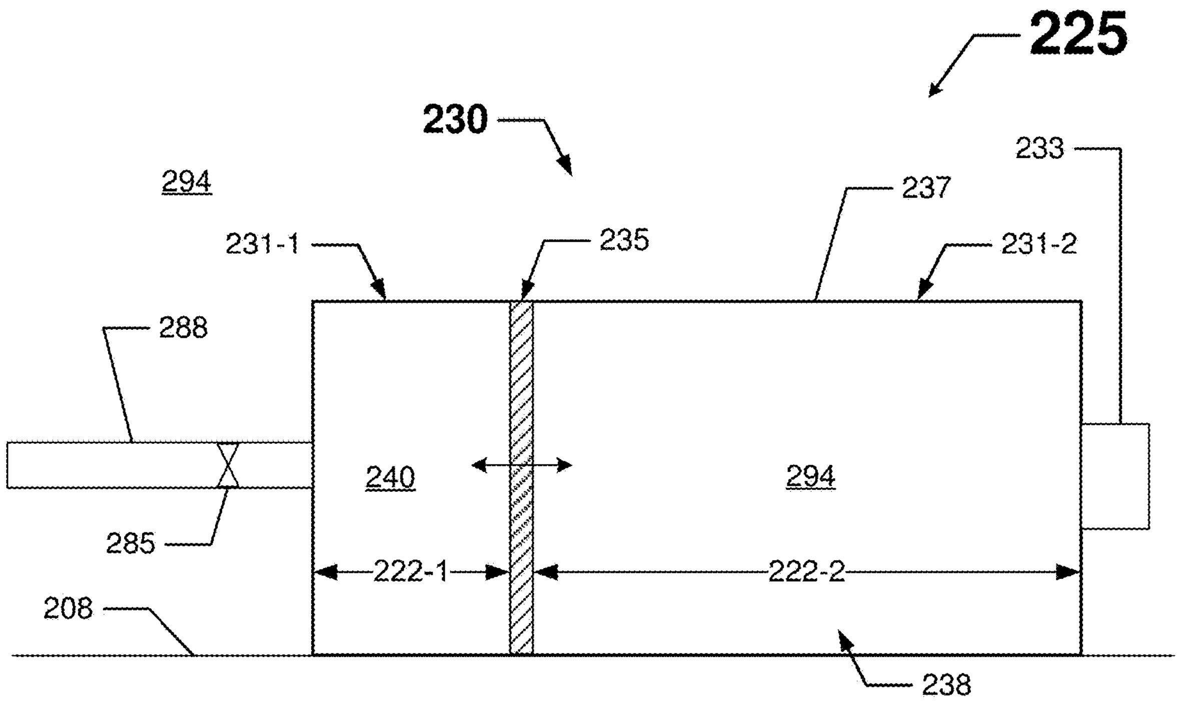

FIGS. 2A through 2C show various views of a block diagram of an example self-regulating annulus pressure system 225 according to certain example embodiments. Specifically, FIG. 2A shows the self-regulating annulus pressure system 225 in a default position. FIG. 2B shows the self-regulating annulus pressure system 225 operating during production operations. FIG. 2C shows the self-regulating annulus pressure system 225 operating during injection operations. Referring to the description above with respect to FIG. 1, the self-regulating annulus pressure system 225 of FIGS. 2A through 2C includes an accumulator 230, piping 288, and one or more valves 285. The controller (similar to the controller 104 discussed above), the communication links (similar to the communication links 105 above), and the power transfer links (similar to the power transfer links 187 above) of the self-regulating annulus pressure system 225 are omitted from FIGS. 2A through 2C to simplify the drawing. Also, the accumulator 230, the piping 288, and the valves 285 are substantially similar to the accumulator 130, the piping 188, and the valves 185 discussed above.

The accumulator 230 of the self-regulating annulus pressure system 225 of FIGS. 2A through 2C has one or more walls 237 that form a cavity 238. The accumulator 230 may have any of a number of shapes (e.g., cylindrical, a cube, conical, a three-dimensional rectangle). The walls 237 of the accumulator 230 are configured (e.g., in terms of thickness, in terms of material) to withstand the conditions (e.g., high pressure, low temperature, salt water) of the environment in which the accumulator 230 is placed. Also, the size of the cavity 238 may be configured to accommodate the volume of the portion (e.g., portion 193) of the annulus (e.g., annulus 192) and the annulus fluid 240 (substantially similar to the annulus fluid 140) therein. The accumulator 230 in this case may be set on or near the ground 208 (substantially similar to the ground 108 discussed above).

In certain example embodiments, the cavity 238 formed by the one or more walls 237 is divided into multiple chambers 231. In this example, there are two chambers 231 (chamber 231-1 and chamber 231-2) that form, along with the fluidic barrier 235 (discussed below), the entirety of the cavity 238 of the accumulator 230. Chamber 231-1 is located at one end (e.g., the proximal end) of the accumulator 230, and chamber 231-2 is located at the other end (e.g., the distal end) of the accumulator 230. Chamber 231-1 (sometimes called the annulus fluid chamber herein) is filled, at least partially, with annulus fluid 240, and one end (e.g., the distal end) of the piping 288 terminates in chamber 231-1 of the accumulator 230. In this way, since the other end (e.g., the proximal end) of the piping 288 penetrates an aperture in a component (e.g., component 146) of the subsea wellhead (e.g., wellhead 145) and terminates in the portion (e.g., portion 193) of the annulus (e.g., annulus 192) of the subsea wellbore (e.g., wellbore 111), chamber 231-1 is in fluidic communication with the portion of the annulus, which is also filled, at least partially, with the annulus fluid 240.

Chamber 231-2 (sometimes called the regulating fluid chamber herein) is filled, at least partially, with regulating fluid 294 in the form of the water (e.g., seawater) in which the accumulator 230 is submerged. In such a case, the far end (e.g., the distal end) of the chamber 231-2 includes an inlet 233 that provides for fluidic communication between the chamber 231-2 and the external environment (in this case, the water in the subsea). In alternative embodiments, the regulating fluid 294 in the chamber 231-2 of the accumulator 230 may be different than the water or other fluid (e.g., air) in the external environment, and the inlet 233 may be omitted so that there is no fluidic communication between the chamber 231-2 and the external environment.

Also included in the cavity 238 of the accumulator 230, positioned between the chamber 231-1 and the chamber 231-2, is a fluidic barrier 235 (in this case, in the form of a piston) that is configured to move laterally (e.g., toward the distal end of the accumulator 230, toward the proximal end of the accumulator 230) within the cavity 238. The fluidic barrier 235 prevents fluidic communication between the chamber 231-1 and the chamber 231-2. As a result, substantially none of the annulus fluid 240 migrates through the fluidic barrier 235 to chamber 231-2, and substantially none of the regulating fluid 294 migrates through the fluidic barrier 235 to chamber 231-1. The fluidic barrier 235 may include one or more of any of a number of features (e.g., O-rings, seals) to both prevent fluidic communication therethrough and to allow for lateral movement of the fluidic barrier 235 within the cavity 238. In addition, the inner surface of one or more walls 237 adjacent to the fluidic barrier 235 in the cavity 238 may have features (e.g., planar, a smooth surface) that allow for the fluidic barrier 235 to function effectively.

Because the fluidic barrier 235 moves laterally within the cavity 238 of the accumulator 230, the size of the chambers 231 may change. Since the fluidic barrier 235 only moves laterally, the height and depth of the chambers 231 do not change over time. Instead, only the widths 222 of the chambers 231 change due to movement of the fluidic barrier 235. A change in width 222 in a chamber 231 results in a change in volume of that chamber 231. In FIG. 2A, when the fluidic barrier 235 is in a default position within the cavity 238 of the accumulator 230, chamber 231-1 has a width 222-1 (which corresponds to a volume of the chamber 231-1), and chamber 231-2 has a width 222-2 (which corresponds to a volume of the chamber 231-2).

In FIG. 2B, which shows a point in time during a field operation that includes production of the wellbore (e.g., wellbore 111), the temperature of the fluid flowing up the cavity (e.g., cavity 196) of the tubing string (e.g., tubing string 177) is hot relative to the temperature of the annulus fluid 240 in the portion (e.g., portion 193) of the annulus (e.g., annulus 192). As a result, the pressure in the portion of the annulus increases. By incorporating an example self-regulating annulus pressure system 225 into the field system (e.g., field system 100), the proximal end of the piping 288 (not shown in FIGS. 2A through 2C, but substantially the same as the proximal end of the piping 188 in FIG. 1) penetrates an aperture in a component (e.g., component 146) of the wellhead (e.g., wellhead 145). This allows some of the annulus fluid 240, forced upward within the portion of the annulus by the increased pressure induced by the heated fluid flowing up the cavity of the tubing string, to enter the piping 288 and flow into the chamber 231-1 of the accumulator 230.

When the pressure (e.g., as translated from temperature) of the annulus fluid 240 that flows through the piping 288 into the chamber 231-1 of the accumulator 230 is greater than the pressure (in this case, hydrostatic pressure) of the regulating fluid 294 (in this case, water) in the chamber 231-2, the annulus fluid 240 pushes the fluidic barrier 235 toward the distal end of the accumulator 230. For example, during production, the temperature of the annulus fluid 140 may be 250° F., while the temperature of the regulating fluid 294 may be 50° F. As a result, the width 222-1 (and so also the volume) of chamber 231-1 increases relative to the default position (shown in FIG. 2A), and the width 222-2 (and so also the volume) of chamber 231-2 decreases relative to the default position. Eventually, when the pressure of the annulus fluid 240 is substantially equal to the hydrostatic pressure (considering factors such as, for example, friction between the fluidic barrier 235 and the inner surface of the wall 237 of the accumulator 230), the fluidic barrier 235 stops moving, and the width 222-1 (and so also the volume) of chamber 231-1 and the width 222-2 (and so also the volume) of chamber 231-2 remain constant.

If, at a later time, the pressure of the annulus fluid 240 in the portion of the annulus changes significantly enough, the difference in pressure between chamber 231-1 and chamber 231-2 will cause the fluidic barrier 235 to move relative to what is captured in FIG. 2B, changing the widths 222 (and so also the volumes) of the chambers 231. For example, if the pressure of the annulus fluid 240 in the portion of the annulus increases significantly enough relative to what is captured in FIG. 2B, the width 222-1 (and so also the volume) of chamber 231-1 further increases relative to what is shown in FIG. 2B, and the width 222-2 (and so also the volume) of chamber 231-2 further decreases relative to what is shown in FIG. 2B. Conversely, if the pressure of the annulus fluid 240 in the portion of the annulus decreases significantly enough relative to what is captured in FIG. 2B, the width 222-1 (and so also the volume) of chamber 231-1 decreases relative to what is shown in FIG. 2B, and the width 222-2 (and so also the volume) of chamber 231-2 increases relative to what is shown in FIG. 2B.

Put another way, the fluidic barrier 235 moves to increase the width 222-1 (and so also the volume) of the chamber 231-1 and decrease the width 222-2 (and so also the volume) of the chamber 231-2 when the pressure in the portion of the annulus (as communicated into the chamber 231-1) exceeds the pressure in the chamber 231-2 (also sometimes referred to as a differential pressure) by a threshold value. Increasing the size of the chamber 231-1 reduces pressure in the portion (e.g., portion 193) of the annulus (e.g., annulus 192) of the subsea wellbore (e.g., wellbore 111) by allowing the annulus fluid 240 to flow from the portion of the annulus into the enlarged chamber 231-1 of the accumulator 230 through the piping 288.

In FIG. 2C, which shows a point in time during a field operation that includes injection into the wellbore (e.g., wellbore 111), the temperature of the fluid flowing down the cavity (e.g., cavity 196) of the tubing string (e.g., tubing string 177) may be cold relative to the temperature of the annulus fluid 240 in the portion (e.g., portion 193) of the annulus (e.g., annulus 192). As a result, the pressure in the portion of the annulus decreases. By incorporating an example self-regulating annulus pressure system 225 into the field system (e.g., field system 100), the proximal end of the piping 288 (not shown in FIGS. 2A through 2C, but substantially the same as the proximal end of the piping 188 in FIG. 1) penetrates an aperture in a component (e.g., component 146) of the wellhead (e.g., wellhead 145). This allows some of the annulus fluid 240 in the chamber 231-1 of the accumulator 230 to be drawn through the piping 288 into the portion of the annulus by the decreased pressure induced by the cooled fluid flowing up the cavity of the tubing string.

When the pressure of the annulus fluid 240 in the chamber 231-1 of the accumulator 230 is less than the pressure (in this case, hydrostatic pressure) of the regulating fluid 294 (in this case, water) in the chamber 231-2, the regulating fluid 294 pushes the fluidic barrier 235 toward the proximal end of the accumulator 230. As a result, the width 222-1 (and so also the volume) of chamber 231-1 decreases relative to the default position (shown in FIG. 2A), and the width 222-2 (and so also the volume) of chamber 231-2 increases relative to the default position. Eventually, when the pressure of the annulus fluid 240 is substantially equal to the hydrostatic pressure (considering factors such as, for example, friction between the fluidic barrier 235 and the inner surface of the wall 237 of the accumulator 230), the fluidic barrier 235 stops moving, and the width 222-1 (and so also the volume) of chamber 231-1 and the width 222-2 (and so also the volume) of chamber 231-2 remain constant.

If, at a later time, the pressure of the annulus fluid 240 in the portion of the annulus changes significantly enough, the difference in pressure between chamber 231-1 and chamber 231-2 will cause the fluidic barrier 235 to move relative to what is captured in FIG. 2C, changing the widths 222 (and so also the volumes) of the chambers 231. For example, if the pressure of the annulus fluid 240 in the portion of the annulus increases significantly enough relative to what is captured in FIG. 2C, the width 222-1 (and so also the volume) of chamber 231-1 increases relative to what is shown in FIG. 2C, and the width 222-2 (and so also the volume) of chamber 231-2 decreases relative to what is shown in FIG. 2C. Conversely, if the pressure of the annulus fluid 240 in the portion of the annulus decreases significantly enough relative to what is captured in FIG. 2B, the width 222-1 (and so also the volume) of chamber 231-1 further decreases relative to what is shown in FIG. 2C, and the width 222-2 (and so also the volume) of chamber 231-2 further increases relative to what is shown in FIG. 2C.

Put another way, the fluidic barrier 235 moves to decrease the width 222-1 (and so also the volume) of the chamber 231-1 and increase the width 222-2 (and so also the volume) of the chamber 231-2 when the pressure in the portion of the annulus (as communicated into the chamber 231-1) is less than the pressure in the chamber 231-2 (also sometimes referred to as a differential pressure) by a threshold value. Decreasing the size of the chamber 231-1 increases pressure in the portion (e.g., portion 193) of the annulus (e.g., annulus 192) of the subsea wellbore (e.g., wellbore 111) by allowing the annulus fluid 240 to flow from the shrinking chamber 231-1 of the accumulator 230 into the portion of the annulus through the piping 288.

Figure 3:
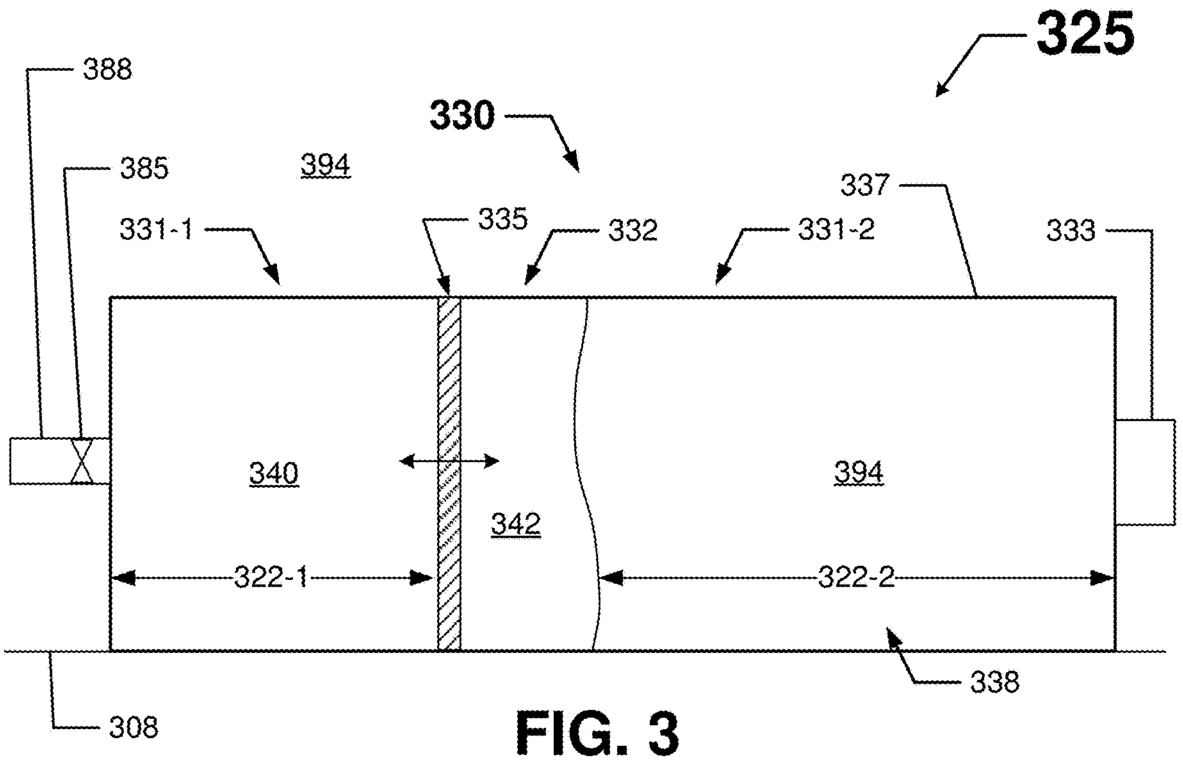
FIG. 3 shows a block diagram of another example self-regulating annulus pressure system according to certain example embodiments.

FIG. 3 shows a block diagram of another example self-regulating annulus pressure system 325 according to certain example embodiments. Referring to the description above with respect to FIGS. 1 and 2, the self-regulating annulus pressure system 325 of FIG. 3 includes an accumulator 330, piping 388, and one or more valves 385. The controller (similar to the controller 104 discussed above), the communication links (similar to the communication links 105 above), and the power transfer links (similar to the power transfer links 187 above) of the self-regulating annulus pressure system 325 are omitted from FIG. 3 to simplify the drawing. Also, the accumulator 330, the piping 388, and the valves 385 are substantially similar to the accumulators, the piping, and the valves discussed above.

The accumulator 330 of the self-regulating annulus pressure system 325 of FIG. 3 is substantially the same as the accumulator 230 of the self-regulating annulus pressure system 225 of FIG. 2, except as described below. For example, the accumulator 330 of FIG. 3 has one or more walls 337 that form a cavity 338. The accumulator 330 may have any of a number of shapes (e.g., cylindrical, a cube, conical, a three-dimensional rectangle). The walls 337 of the accumulator 330 are configured (e.g., in terms of thickness, in terms of material) to withstand the conditions (e.g., high pressure, low temperature, salt water) of the environment in which the accumulator 330 is placed. Also, the size of the cavity 338 may be configured to accommodate the volume of the portion (e.g., portion 193) of the annulus (e.g., annulus 192) and the annulus fluid 340 (substantially similar to the annulus fluid 140) therein. The accumulator 330 in this case may be set on or near the ground 308 (substantially similar to the ground 108 discussed above)

In certain example embodiments, the cavity 338 formed by the one or more walls 337 is divided into multiple chambers 331. In this example, there are two chambers 331 (chamber 331-1 and chamber 331-2) that form, along with the fluidic barrier 335 and the bladder 332 (discussed below), the entirety of the cavity 338 of the accumulator 330. Chamber 331-1 is located at one end (e.g., the proximal end) of the accumulator 330, and chamber 331-2 is located at the other end (e.g., the distal end) of the accumulator 330. Chamber 331-1 (sometimes called the annulus fluid chamber herein) is filled, at least partially, with annulus fluid 340, and one end (e.g., the distal end) of the piping 388 terminates in chamber 331-1 of the accumulator 330. In this way, since the other end (e.g., the proximal end) of the piping 388 penetrates an aperture in a component (e.g., component 146) of the subsea wellhead (e.g., wellhead 145) and terminates in the portion (e.g., portion 193) of the annulus (e.g., annulus 192) of the subsea wellbore (e.g., wellbore 111), chamber 331-1 is in fluidic communication with the portion of the annulus, which is also filled, at least partially, with the annulus fluid 340.

Chamber 331-2 (sometimes called the regulating fluid chamber herein) is filled, at least partially, with regulating fluid in the form of the water 394 (e.g., seawater) in which the accumulator 330 is submerged. In such a case, the far end (e.g., the distal end) of the chamber 331-2 includes an inlet 333 that provides for fluidic communication between the chamber 331-2 and the external environment (in this case, the water 394 in the subsea). In alternative embodiments, the regulating fluid in the chamber 331-2 of the accumulator 330 may be different than the water 394 or other fluid (e.g., air) in the external environment, and the inlet 333 may be omitted so that there is no fluidic communication between the chamber 331-2 and the external environment.

Also included in the cavity 338 of the accumulator 330, positioned between the chamber 331-1 and the chamber 331-2, is a fluidic barrier 335 (in this case, in the form of a piston) that is configured to move laterally (e.g., toward the distal end of the accumulator 330, toward the proximal end of the accumulator 330) within the cavity 338. The fluidic barrier 335 prevents fluidic communication between the chamber 331-1 and the chamber 331-2. As a result, substantially none of the annulus fluid 340 migrates through the fluidic barrier 335 to chamber 331-2, and substantially none of the regulating fluid 394 migrates through the fluidic barrier 335 to chamber 331-1. The fluidic barrier 335 may include one or more of any of a number of features (e.g., O-rings, seals) to both prevent fluidic communication therethrough and to allow for lateral movement of the fluidic barrier 335 within the cavity 338. In addition, the inner surface of one or more walls 337 adjacent to the fluidic barrier 335 in the cavity 338 may have features (e.g., planar, a smooth surface) that allow for the fluidic barrier 335 to function effectively.

Because the fluidic barrier 335 moves laterally within the cavity 338 of the accumulator 330, the size of the chambers 331 may change. Since the fluidic barrier 335 only moves laterally, the height and depth of the chambers 331 do not change over time. Instead, only the widths 322 (width 322-1, width 322-2) of the chambers 331 (chamber 331-1, chamber 331-2) change due to movement of the fluidic barrier 335. A change in width 322 in a chamber 331 results in a change in volume of that chamber 331.

Unlike the accumulator 230 of FIG. 2, the accumulator 330 of FIG. 3 also includes a bladder 332 located inside the cavity 338. The bladder 332 is configured to act as a type of filter or barrier to help keep impurities (e.g., sand, dirt, marine life) that are in the regulating fluid 394 in the chamber 331-2 from interacting with (and potentially interfering with the performance of) the fluidic barrier 335. The bladder 332 may be rigid or flexible (as shown in this example). The bladder 332 may be solid (e.g., have no cavity) or have one or more cavities. In the latter case, a cavity of the bladder 332 may be empty (e.g., a vacuum), filled with a material 342 in the form of a solid, air, and/or some other fluid (e.g., nitrogen gas). The bladder 332 is an optional feature that, when present in the accumulator 330, may be coupled to the fluidic barrier 335 between the regulating fluid 394 in the chamber 331-2.

In some cases, an accumulator 330 of an example self-regulating annulus pressure system 325 may include multiple bladders 332. For example, a second bladder 332 may be added to the accumulator 330 of FIG. 3 between the annulus fluid 340 in the chamber 331-1 and the fluidic barrier 335. In such a case, the added second bladder 332 may be coupled to a side (e.g., the front) of the fluidic barrier 335 opposite the side (e.g., the rear) of the fluidic barrier 335 to which the bladder 332 shown in FIG. 3 is coupled. The operation of the accumulator 330 of FIG. 3 is substantially the same as the operation of the accumulator 230 of FIG. 2 above, except that the bladder 332 may cause an increase in the frictional force, and so potentially raise the threshold value of the differential pressure required between the chambers 331 in the cavity 338 to cause the fluidic barrier 335 to move.

Figure 4:
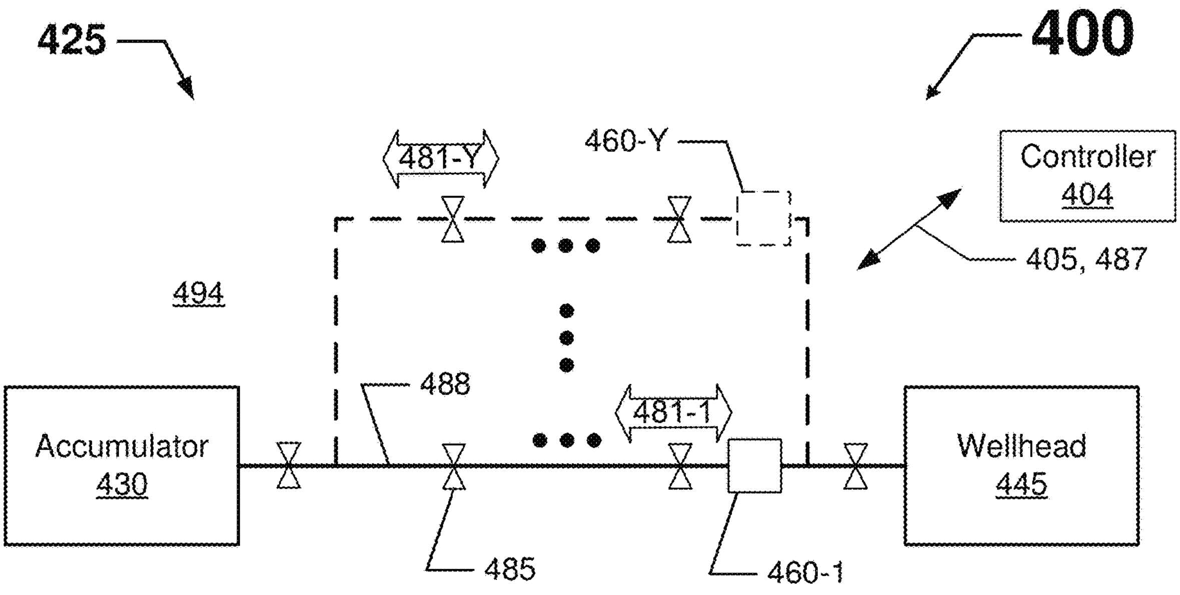
FIG. 4 shows a block diagram of part of a field system that includes an example self-regulating annulus pressure system according to certain example embodiments.

FIG. 4 shows a block diagram of part of a field system 400 that includes an example self-regulating annulus pressure system 425 according to certain example embodiments. Referring to the description above with respect to FIGS. 1 through 3, the part of the field system 400 of FIG. 4 includes the self-regulating annulus pressure system 425 and a wellbore 445. The wellbore 445 is substantially the same as the wellbore 145 discussed above. The self-regulating annulus pressure system 425 includes a controller 404, an accumulator 430, piping 488 with multiple flow paths 481, one or more sensor devices 460, communication links 405, power transfer links 487, and one or more valves 485. The various components (e.g., the accumulator 430, the controller 404, the communication links 405, the piping 488) of the self-regulating annulus pressure system 425 of FIG. 4 are substantially the same as the corresponding components of the self-regulating annulus pressure systems discussed above. The self-regulating annulus pressure system 425 and the wellhead 445 are located in the subsea (so in this case, the regulating fluid 494 is the surrounding the sea water).

The piping 488 in this case is arranged to have multiple potential flow paths 481 between the wellhead 445 and the accumulator 430. In such cases, the piping 488 may have any number (e.g., 1, 2, 3, 4, 7, 10) of flow paths 481. In this example, there are Y flow paths 481 (e.g., flow path 481-1 through flow path 481-Y). The flow paths 481 in this case are arranged in parallel to each other. Each flow path 481 in this case includes at least one sensor device 460 and at least one valve 485. Also, in this case, there is a valve 485 at a common header in the piping 488 at the wellhead 445 as well as another valve 485 at a common header in the piping 488 at the accumulator 430. When the piping 488 of the self-regulating annulus pressure system 425 has multiple flow paths 481, the configuration (e.g., length, inner diameter, number of valves 485, types of valves 485, internal parallel flow paths) of one flow path 481 may be the same as, or different than, the configuration of one or more of the other flow paths 481.

The multiple flow paths 481 in the piping 488 show how the controller 404, using communication links 405 and/or power transfer links 487, may recognize a problem with a flow path 481 in the piping 488. Specifically, the controller 404 may communicate with one or more of the sensor devices 460 measuring a parameter (e.g., flow rate, temperature, pressure) associated with the annulus fluid (e.g., annulus fluid 140) at a point in the piping 488 to determine whether there is a problem with the piping 488 and, if so, where. There may additionally or alternatively be one or more sensor devices 460 located at other points (e.g., in the chamber (e.g., chamber 331-1) in which the annulus fluid is located in the accumulator 430, at the wellhead 445) in the self-regulating annulus pressure system 425 and/or other parts of the field system 400 to help the controller 404 evaluate the performance of the piping 488, the valves 485, the sensor devices 460, and/or the accumulator 430.

If a problem with the piping 488 is detected by the controller 404 based on measurements made by the one or more sensor devices 460, the controller 404 may generate and send a notification to a user 151 (including an associated user system 155) as to the issue. Such a notification may be general (e.g., "there is a problem with the self-regulating annulus pressure system") or more specific (e.g., "the pressure in the annulus is above an alarm level, and it appears that the piston in the accumulator is stuck"). In addition, or in the alternative, the controller 404 may actively attempt to fix or reduce the effects of the problem. For example, the controller 404 may operate one or more of the valves 485 to add, remove, and/or change one or more flow paths 481 if the controller 404 determines that one of the flow paths 481 has a leak or blockage.

Figure 5:
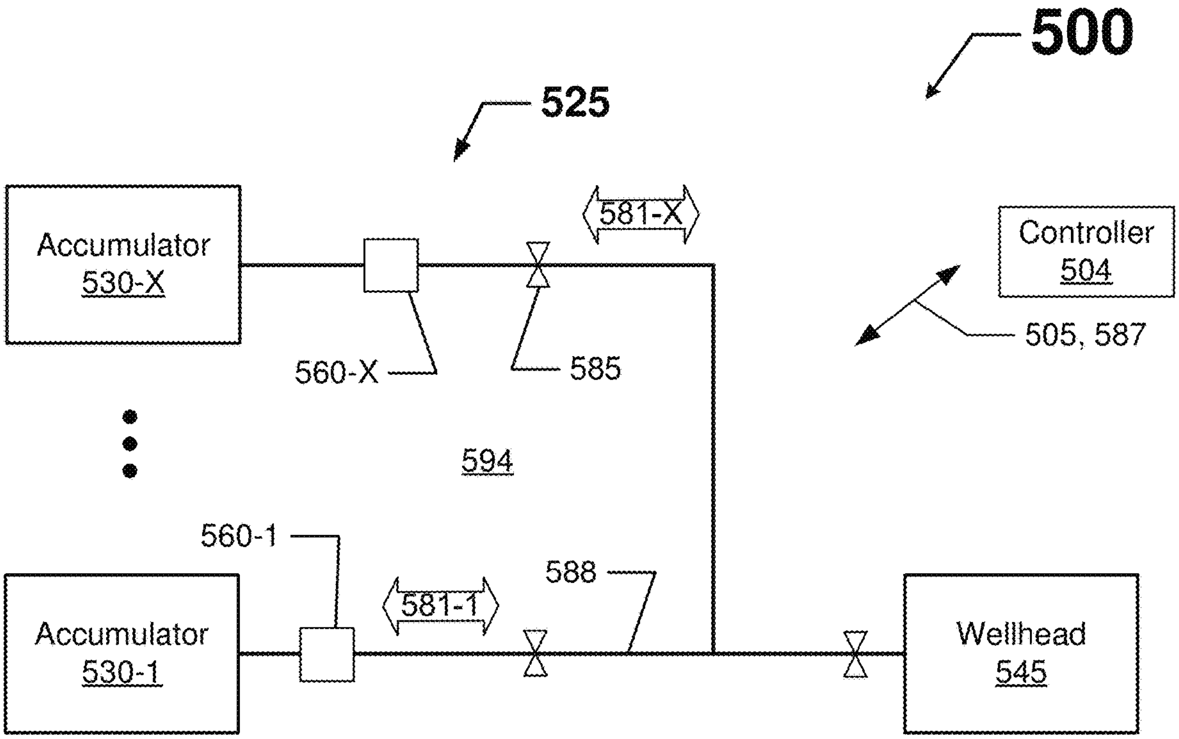
FIG. 5 shows a block diagram of part of another field system that includes an example self-regulating annulus pressure system according to certain example embodiments.

FIG. 5 shows a block diagram of part of another field system 500 that includes an example self-regulating annulus pressure system 525 according to certain example embodiments. Referring to the description above with respect to FIGS. 1 through 4, the part of the field system 500 of FIG. 5 includes the self-regulating annulus pressure system 525 and a wellbore 545. The wellbore 545 is substantially the same as the wellbore 145 discussed above. The self-regulating annulus pressure system 525 in this case includes a controller 504, multiple accumulators 530, piping 588, multiple sensor devices 560, communication links 505, power transfer links 587, and multiple valves 585. The various components (e.g., the accumulators 530, the controller 504, the communication links 505, the piping 588) of the self-regulating annulus pressure system 525 of FIG. 5 are substantially the same as the corresponding components of the self-regulating annulus pressure systems discussed above. The self-regulating annulus pressure system 525 and the wellhead 545 are located in the subsea (so in this case, the regulating fluid 594 is the surrounding the sea water).

The self-regulating annulus pressure system 525 in this case has multiple accumulators 530. In such cases, the self-regulating annulus pressure system 525 can have any number (e.g., 1, 2, 3, 4, 7, 10) of accumulators 530. In this example, there are X accumulators 530 (accumulator 530-1 through accumulator 530-X). The accumulators 530 are arranged in parallel with each other in this case. When the self-regulating annulus pressure system 525 has multiple accumulators 530, the configuration (e.g., length, width, height, number of chambers, type of fluidic barrier, default position of the fluidic barrier, the existence of a bladder) of one accumulator 530 may be the same as, or different than, the configuration of one or more of the other accumulators 530.

The piping 588 in this case is arranged to have a single flow path 581 between the wellhead 545 and each accumulator 530. As a result, the piping 488 has flow path 581-1 through flow path 581-X. In alternative embodiments, the piping 588 may have any number (e.g., 1, 2, 3, 4, 7, 10) of parallel flow paths within a flow path 581. The flow paths 581 in this case are arranged in parallel to each other. Each flow path 581 in this case includes at least one sensor device 560 (sensor device 560-1 through sensor device 560-X) and at least one valve 585. Also, in this case, there is a valve 585 at a common header in the piping 488 at the wellhead 545.

The multiple accumulators 530 with related flow paths 581 in the piping 488 show how the controller 504, using communication links 505 and/or power transfer links 587, may recognize a problem within the self-regulating annulus pressure system 525. Specifically, the controller 504 may communicate with one or more of the sensor devices 560 measuring a parameter (e.g., flow rate, temperature, pressure) associated with the annulus fluid (e.g., annulus fluid 140) at a point in the piping 588 and/or an accumulator 530 to determine whether there is a problem within the self-regulating annulus pressure system 525 and, if so, where. There may additionally or alternatively be one or more sensor devices 560 located at other points (e.g., in the chamber (e.g., chamber 331-1) in which the annulus fluid is located in one of the accumulators 530, at the wellhead 545) in the self-regulating annulus pressure system 525 and/or other parts of the field system 500 to help the controller 504 evaluate the performance of the piping 588, the valves 585, the sensor devices 560, and/or the accumulators 530.

Figure 6:
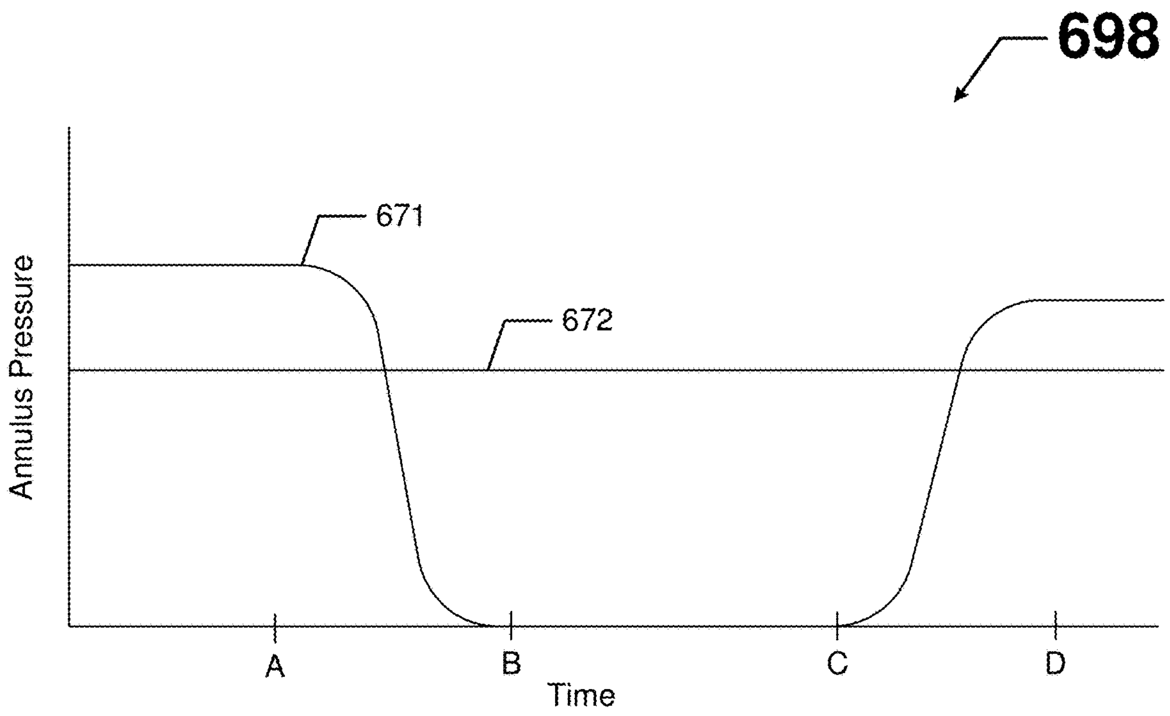
FIG. 6 shows a graph of annulus pressure based on using an example self-regulating annulus pressure system for an injection well according to certain example embodiments.

FIG. 6 shows a graph 698 of annulus pressure based on using an example self-regulating annulus pressure system for an injection well according to certain example embodiments. Referring to the description above with respect to FIGS. 1 through 5, the graph 698 of FIG. 6 plots annulus pressure along the vertical axis versus time along the horizontal axis. The graph 698 shows one plot 671 of annulus pressure over time is based on the current art (without the example self-regulating annulus pressure system) and another plot 672 of annulus pressure over time using the example self-regulating annulus pressure system. As the plot 672 of FIG. 6 shows, the annulus pressure across all of the various events (e.g., starting an injection operation, ending the injection operation) using the example self-regulating annulus pressure system is substantially constant.

By contrast, as shown in plot 671, without the example self-regulating annulus pressure system, the annulus pressure varies substantially over time. For example, up until time A, the wellbore is shut in, and the annulus pressure is at a high constant rate that exceeds the annulus pressure for plot 672. At time A when the injection operation begins, the annulus pressure drops at an extreme rate to substantially zero, at time B. Between time B and time C, when injection operations are ongoing, the annulus pressure remains at substantially zero. At time C, when the injection operations end, until time D, when the wellbore is shut back in, the annulus pressure increases at a dramatic rate until settling at a higher annulus pressure than the annulus pressure of plot 672. The plot 672 assumes that there are no failures due to the excessively low pressure in the annulus, and as discussed above, such failures due to near zero annulus pressure during an injection operation are not unusual.

Figure 7:
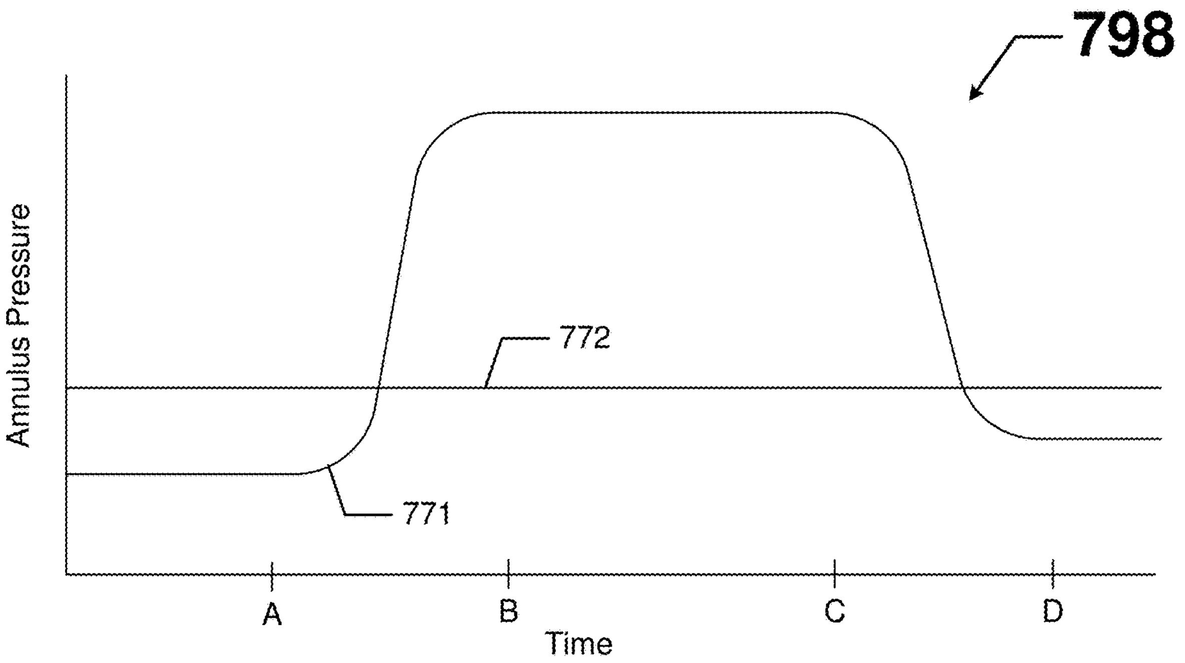
FIG. 7 shows a graph of annulus pressure based on using an example self-regulating annulus pressure system for a production well according to certain example embodiments.

FIG. 7 shows a graph 798 of annulus pressure based on using an example self-regulating annulus pressure system for a production well according to certain example embodiments. Referring to the description above with respect to FIGS. 1 through 6, the graph 798 of FIG. 7 plots annulus pressure along the vertical axis versus time along the horizontal axis. The graph 798 shows one plot 771 of annulus pressure over time is based on the current art (without the example self-regulating annulus pressure system) and another plot 772 of annulus pressure over time using the example self-regulating annulus pressure system. As the plot 772 of FIG. 7 shows, the annulus pressure across all of the various events (e.g., starting a production operation, ending the production operation) using the example self-regulating annulus pressure system is substantially constant.

By contrast, as shown in plot 771, without the example self-regulating annulus pressure system, the annulus pressure varies substantially over time. For example, up until time A, the wellbore is shut in, and the annulus pressure is at a constant rate that is less than the annulus pressure for plot 772. At time A when the production operation begins, the annulus pressure rises at an extreme rate to a high level, at time B. Between time B and time C, when production operations are ongoing, the annulus pressure remains at a constantly high rate. At time C, when the production operations end, until time D, when the wellbore is shut back in, the annulus pressure decreases at a dramatic rate until settling at a lower annulus pressure than the annulus pressure of plot 772.

The plot 772 assumes that there are no failures due to the excessively high pressure in the annulus, and as discussed above, such failures due to elevated annulus pressure during a production operation are not unusual. Also, it should be noted that because the annulus pressure between injection (as shown by plot 672 in FIG. 6) and production (as shown by plot 772 of FIG. 7) are not substantially different from each other and are both substantially constant before, during, and after the respective field operation, the chemical content of the annulus fluid 140 may remain unchanged between injection and production operations. In the current art, the chemical composition of the annulus fluid for an injection operation is different than the chemical composition of the annulus fluid for a production operation, at least in part because of the substantial swings in annulus pressure, as shown by plot 671 in FIG. 6 and plot 771 in FIG. 7, respectively.

Figure 8:
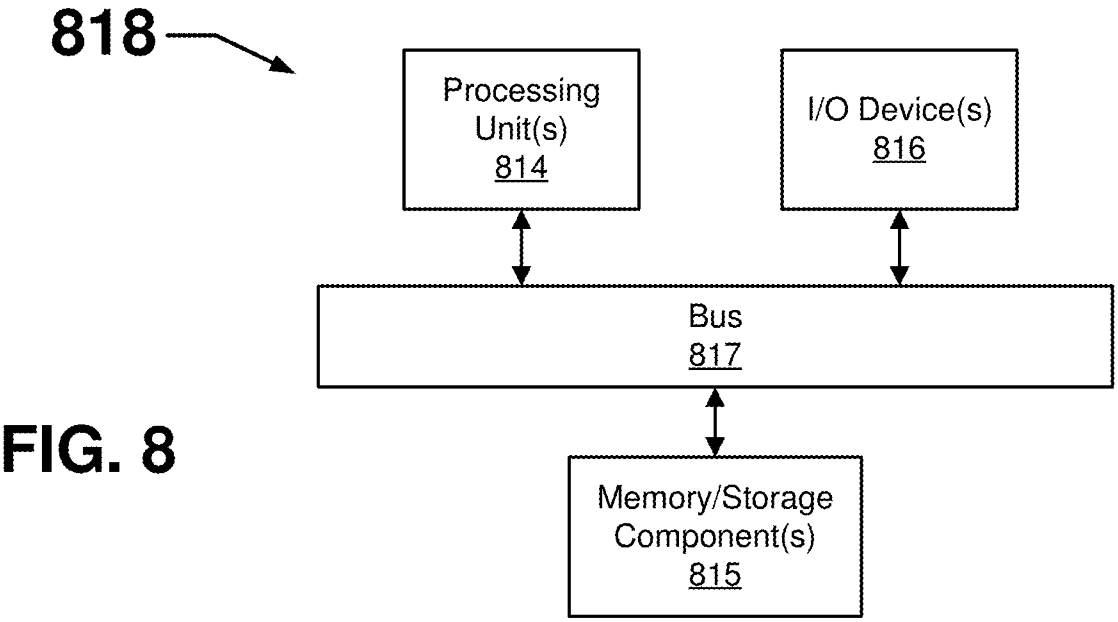
FIG. 8 shows a block diagram of a computing device according to certain example embodiments.

FIG. 8 shows a block diagram of a computing device 818 according to certain example embodiments. Specifically, FIG. 8 illustrates one embodiment of a computing device 818 that implements one or more of the various techniques described herein, and which is representative, in whole or in part, of the elements described herein pursuant to certain example embodiments. For example, a controller 104 (including components thereof, such as a control engine, a hardware processor, a storage repository, a power module, and a transceiver) may be considered a computing device 818. Computing device 818 is one example of a computing device and is not intended to suggest any limitation as to scope of use or functionality of the computing device and/or its possible architectures. Neither should the computing device 818 be interpreted as having any dependency or requirement relating to any one or combination of components illustrated in the example computing device 818.

The computing device 818 includes one or more processors or processing units 814, one or more memory/storage components 815, one or more input/output (I/O) devices 816, and a bus 817 that allows the various components and devices to communicate with one another. The bus 817 represents one or more of any of several types of bus structures, including a memory bus or memory controller, a peripheral bus, an accelerated graphics port, and a processor or local bus using any of a variety of bus architectures. The bus 817 includes wired and/or wireless buses.

The memory/storage component 815 represents one or more computer storage media. The memory/storage component 815 includes volatile media (such as random access memory (RAM)) and/or nonvolatile media (such as read only memory (ROM), flash memory, optical disks, magnetic disks, and so forth). The memory/storage component 815 includes fixed media (e.g., RAM, ROM, a fixed hard drive, etc.) as well as removable media (e.g., a Flash memory drive, a removable hard drive, an optical disk, and so forth).

One or more I/O devices 816 allow a user 151 to enter commands and information to the computing device 818, and also allow information to be presented to the user 151 and/or other components or devices. Examples of input devices 816 include, but are not limited to, a keyboard, a cursor control device (e.g., a mouse), a microphone, a touchscreen, and a scanner. Examples of output devices include, but are not limited to, a display device (e.g., a monitor or projector), speakers, a printer, and a network card.

Various techniques are described herein in the general context of software or program modules. Generally, software includes routines, programs, objects, components, data structures, and so forth that perform particular tasks or implement particular abstract data types. An implementation of these modules and techniques is stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 818 (also sometimes called a computer system herein) is connected to a network (not shown) (e.g., a LAN, a WAN such as the Internet, cloud, or any other similar type of network) via a network interface connection (not shown) according to some example embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other example embodiments. Generally speaking, the computer device 818 includes at least the minimal processing, input, and/or output means necessary to practice one or more embodiments.

Further, those skilled in the art will appreciate that one or more elements of the aforementioned computer device 818 is located at a remote location and connected to the other elements over a network in certain example embodiments. Further, one or more embodiments are implemented on a distributed system having one or more nodes, where each portion of the implementation (e.g., the self-regulating annulus pressure system 125) is located on a different node within the distributed system. In one or more embodiments, the node corresponds to a computer system. Alternatively, the node corresponds to a processor with associated physical memory in some example embodiments. The node alternatively corresponds to a processor with shared memory and/or resources in some example embodiments.

Figure 9:
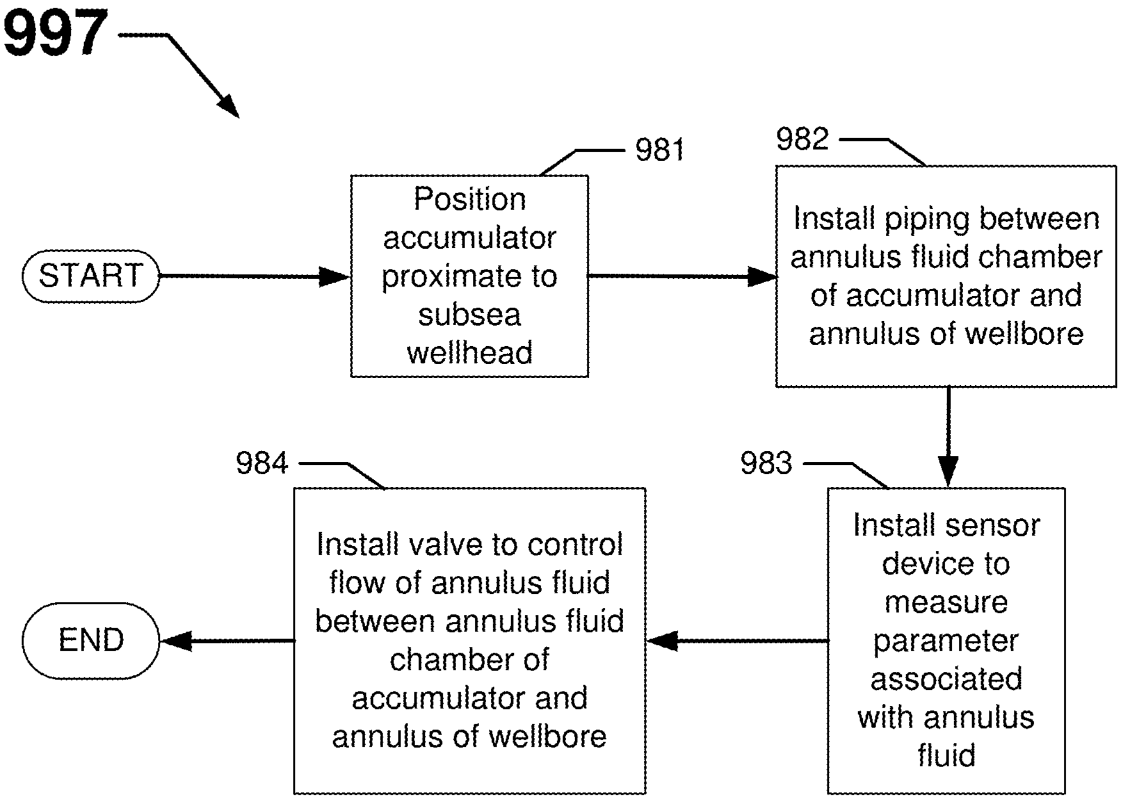
FIG. 9 shows a flowchart of a method for establishing a system for self-regulating pressure within an annulus of a subterranean wellbore according to certain example embodiments.

FIG. 9 shows a flowchart 997 of a method for establishing a system for self-regulating pressure within an annulus of a subterranean wellbore according to certain example embodiments. While the various steps in this flowchart 997 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 9 may be included in performing this method. Accordingly, the specific arrangement of steps should not be construed as limiting the scope. The method shown in FIG. 9 is merely an example that may be performed by using an example self-regulating annulus pressure system 125 described herein. In other words, systems established for self-regulating pressure within an annulus 192 (or portion 193 thereof) of a subterranean wellbore 111 may perform other functions using other methods in addition to and/or aside from those shown in FIG. 9. The method shown in the flowchart 997 of FIG. 9 begins at the START step and proceeds to step 981, where an accumulator 130 is positioned proximate to a subsea wellhead 145. The accumulator 130 includes an annulus fluid chamber 231-1, a regulating fluid chamber 231-2, and a fluidic barrier 235. The accumulator 130 may be set on a skid and set on the ground 108 (e.g., a seabed when the wellhead is subsea). The accumulator 130 may be lowered into place using field equipment (e.g., a ROV in the water 194, a crane on a floating structure) operated by a user 151.

In step 982, piping 188 is installed between the annulus 192 (or portion 193 thereof) of the wellbore 111 and the annulus fluid chamber (e.g., annulus fluid chamber 231-1) of the accumulator 130. The piping 188 may be installed using field equipment (e.g., a ROV in the water 194, a crane on a floating structure) operated by a user 151. The piping 188 may penetrate a aperture in a component 146 of the subsea wellhead 145 to extend into the portion 193 of the annulus 192.

In step 983, one or more sensor devices 160 is installed to measure one or more parameters associated with the annulus fluid 140. Some or all of the sensor devices 160 may be installed in the accumulator 130 and/or the piping 188 prior to the accumulator 130 and/or the piping 188 being installed. In addition, or in the alternative, some or all of the sensor devices 160 may be installed in the accumulator 130 and/or the piping 188 by a ROV, a user 151, and/or some other instrument after the accumulator 130 and/or the piping 188 have been installed.

In step 984, one or more valves 185 is installed to control the flow of annulus fluid 140 between the annulus fluid chamber (e.g., annulus fluid chamber 231-1) and the portion 193 of the annulus 192 of the wellbore 111. Some or all of the valves 185 may be installed in the piping 188 prior to the piping 188 being installed. In addition, or in the alternative, some or all of the valves 185 may be installed in the piping 188 by a ROV, a user 151, and/or some other instrument after the piping 188 has been installed. When step 984 is completed, the process proceeds to the END step, and a field operation may begin.

Figure 10:
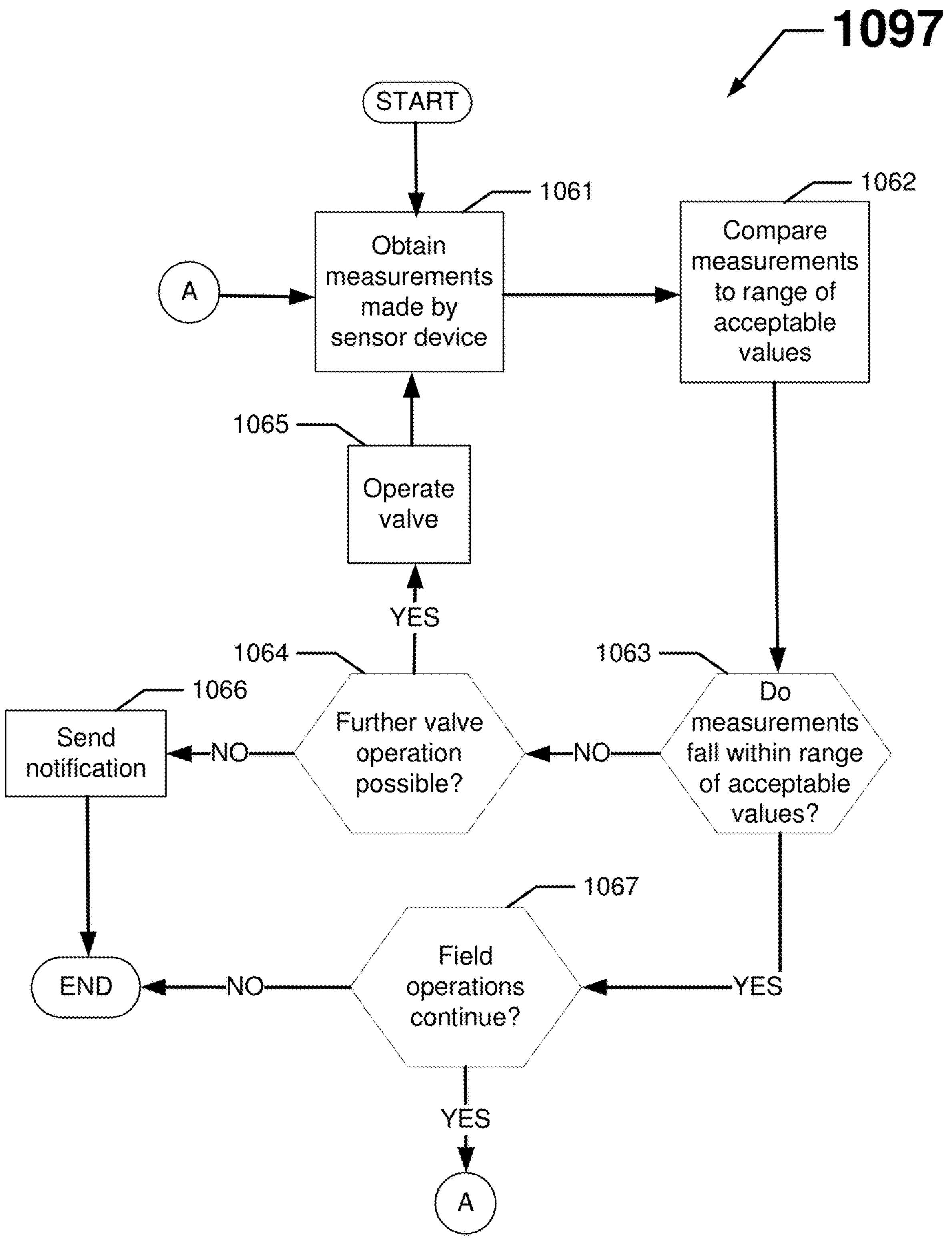
FIG. 10 shows a flowchart of a method for self-regulating pressure within an annulus of a subterranean wellbore according to certain example embodiments.

FIG. 10 shows a flowchart 1097 of a method for self-regulating pressure within an annulus of a subterranean wellbore according to certain example embodiments. While the various steps in this flowchart 1097 are presented sequentially, one of ordinary skill will appreciate that some or all of the steps may be executed in different orders, may be combined or omitted, and some or all of the steps may be executed in parallel. Further, in one or more of the example embodiments, one or more of the steps shown in this example method may be omitted, repeated, and/or performed in a different order.

In addition, a person of ordinary skill in the art will appreciate that additional steps not shown in FIG. 10 may be included in performing this method. Accordingly, the specific arrangement of steps should not be construed as limiting the scope. Further, a particular computing device, such as a controller 104 or other type of computing device discussed above, may be used to perform or facilitate performance of one or more of the steps (or portions thereof) for the method shown in FIG. 10 in certain example embodiments. Any of the functions (or portions thereof) performed below by a controller 104 may involve the use of one or more protocols, one or more algorithms, and/or stored data stored in a storage repository. In some cases, one or more of the various steps in the method of FIG. 10 can be performed automatically, as by the controller 104 of the example self-regulating annulus pressure system 125. In addition, or in the alternative, some or all of a step in the method of FIG. 10 may be performed by a user 151, including an associated user system 155.

The method shown in FIG. 10 is merely an example that may be performed by using an example self-regulating annulus pressure system 125 described herein. In other words, systems for self-regulating annulus pressure may perform other functions using other methods in addition to and/or aside from those shown in FIG. 10. The method shown in the flowchart 1097 of FIG. 10 begins at the START step and proceeds to step 1061, where measurements made by sensor devices 160 are obtained. The measurements may be of temperatures, pressures, flow rates, volumes, and/or any other type of parameter associated with the annulus fluid 140. In some cases, once the measurements are obtained, they are formatted, averaged, organized, and/or otherwise processed. The measurements may be obtained by a controller 104 of the self-regulating annulus pressure system 125 and/or a user 151 (including an associated user system 155).

In step 1062, the measurements made by the sensor devices 160 are compared to a range of acceptable values. The appropriate range of acceptable values used in the comparison may be determined based any of a number of factors, including but not limited to the type of field operation (e.g., injection, production) being performed, the location of the sensor device 160 among the piping 188 and/or accumulator 130, the unit of measure, the state of a valve 185 located in the flow line of the sensor device 160, and the parameter measured by the sensor device 160. At times, a range of acceptable values may be updated (e.g., by a controller 104, by a user 151) based on historical data, based on updates provided, based on a consistent difference between actual values and expected values, and/or based on some other factor or event. The comparison may be made by a controller 104 of the self-regulating annulus pressure system 125 and/or a user 151 (including an associated user system 155).

In step 1063, a determination is made as to whether the measurement falls within the range of acceptable values. The determination may be made by a controller 104 of the self-regulating annulus pressure system 125 and/or a user 151 (including an associated user system 155). If the measurement falls within the range of acceptable values, the process proceeds to step 1067. If the measurement does not fall within the range of acceptable values, the process proceeds to step 1064.

In step 1064, a determination is made as to whether further operation of a valve 185 is possible. In other words, a determination is made as to whether operating a valve 185 in a particular way may put a subsequent measurement made by the sensor device 160 within the range of acceptable values. The determination may be made by a controller 104 of the self-regulating annulus pressure system 125 and/or a user 151 (including an associated user system 155). If further operation of a valve 185 is possible, the process proceeds to step 1065. If further operation of a valve 185 is not possible, the process proceeds to step 1066.

In step 1065, the valve 185 is operated. The valve 185 may be operated by a controller 104 of the self-regulating annulus pressure system 125 and/or a user 151 (including an associated user system 155). When step 1065 is complete, the process reverts to step 1061. In step 1066, a notification is sent. The notification may be general (e.g., "there is a problem with the self-regulating annulus pressure system") or specific (e.g., "there is a leak in the piping of the self-regulating annulus pressure system between the valve and the accumulator"). The notification may be generated and sent by a controller 104 of the self-regulating annulus pressure system 125 and/or a user 151 (including an associated user system 155).

In step 1067, a determination is made as to whether field operations are continuing. The determination may be made by a controller 104 of the self-regulating annulus pressure system 125 and/or a user 151 (including an associated user system 155). If field operations are continuing, the process reverts to step 1061. If field operations are not continuing, the process proceeds to the END step.

Example embodiments can be used to self-regulate the pressure within the annulus (or portion thereof) of a wellbore. Example embodiments include equipment (e.g., valves, sensor devices, controllers) that can monitor performance of the self-regulating system and, in some cases, take corrective action if problems arise. Example embodiments may be used for subsea and/or land-based subterranean operations. Example embodiments may be used for production and/or injection field operations. Example embodiments allow for continuous field operations without needing to pause or terminate the operations due to extreme pressure excursions in the annulus and/or improper chemical composition of the annulus fluid over time. Example embodiments also provide a number of other benefits. Such other benefits can include, but are not limited to, improved useful life of the wellbore and field equipment, more reliable subterranean field operations, time savings, cost savings, and compliance with applicable industry standards and regulations.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A system for self-regulating pressure within an annulus of a subsea wellbore, the system comprising:

an accumulator positioned in an environment surrounded by a regulating fluid, wherein the accumulator comprises:

an annulus fluid chamber that contains an annulus fluid having a first pressure at a first time;

a regulating fluid chamber that contains the regulating fluid having a second pressure at the first time;

an inlet that provides fluidic communication of the regulating fluid between the regulating fluid chamber and the environment in which the accumulator is positioned, wherein the inlet allows the second pressure of the regulating fluid within the regulating fluid chamber to be substantially similar to a hydrostatic pressure of the regulating fluid in the environment external to the accumulator during the first time and during subsequent times; and a physical fluidic barrier movably disposed between the annulus fluid chamber and the regulating fluid chamber; and piping having a first end and a second end, wherein the first end penetrates an aperture in a subsea wellhead and terminates in the annulus of the subsea wellbore, and wherein the second end terminates in the annulus fluid chamber of the accumulator, wherein the physical fluidic barrier moves to increase a first size of the annulus fluid chamber and decrease a second size of the regulating fluid chamber at a second time when the first pressure exceeds the second pressure by a first threshold value, wherein the physical fluidic barrier moves to decrease the first size of the annulus fluid chamber and increase the second size of the regulating fluid chamber at the second time when the second pressure exceeds the first pressure by a second threshold value, wherein increasing the first size of the annulus fluid chamber at the second time reduces pressure in the annulus of the subsea wellbore by allowing annulus fluid to flow from the annulus to the annulus fluid chamber through the piping, and wherein decreasing the first size of the annulus fluid chamber at the second time increases pressure in the annulus of the subsea wellbore by allowing annulus fluid to flow from the annulus fluid chamber to the annulus through the piping.

2. The system of claim 1, wherein the wellbore is being used for injection.

3. The system of claim 1, wherein the wellbore is being used for production.

4. The system of claim 1, wherein the environment is a body of water, and wherein the regulating fluid comprises the water.

5. The system of claim 4, wherein the inlet of the accumulator is open between the regulating fluid chamber and the environment external to the accumulator.

6. The system of claim 1, wherein the annulus fluid comprises a brine.

7. The system of claim 1, further comprising:

a sensor device configured to measure a parameter associated with the annulus fluid.

8. The system of claim 7, further comprising:

a valve positioned in line with the piping.

9. The system of claim 8, further comprising:

a controller communicably coupled to the sensor device and operably coupled to the valve, wherein the controller operates the valve based on a measurement made by the sensor device.

10. The system of claim 9, wherein the controller is configured to generate a notification when a position of the valve needs to be changed.

11. The system of claim 9, wherein the controller is configured to generate a notification when a volume of the annulus fluid in the annulus fluid chamber of the accumulator, as measured by the sensor device, falls outside a range of acceptable values.

12. The system of claim 1, wherein the accumulator further comprises:

a bladder disposed between the fluidic barrier and the regulating fluid chamber.

13. The system of claim 12, wherein the bladder is filled with nitrogen.

14. The system of claim 1, wherein the annulus fluid comprises a substantially similar chemical content for injection and production operations.

15. The system of claim 1, wherein the the subsea wellbore comprises at least one of a group consisting of a subsea Xmas tree, a hanger, a spool, a valve, a gauge, and a choke.

16. The system of claim 15, wherein the tubing hanger is unaltered from an original design.

17. A method for self-regulating pressure within an annulus of a subterranean wellbore, the method comprising:

positioning an accumulator proximate to a subsea wellhead at an entry point of a subterranean wellbore, wherein the accumulator is in an environment surrounded by a regulating fluid, and wherein the accumulator comprises:

an annulus fluid chamber that contains an annulus fluid;

a regulating fluid chamber that contains the regulating fluid;

an inlet that provides fluidic communication of the regulating fluid between the regulating fluid chamber and the environment in which the accumulator is positioned, wherein the inlet allows a regulating fluid pressure of the regulating fluid within the regulating fluid chamber to be substantially similar to a hydrostatic pressure of the regulating fluid in the environment surrounding the accumulator; and a physical fluidic barrier movably disposed between the annulus fluid chamber and the regulating fluid chamber; and installing piping between the annulus fluid chamber of the accumulator and the annulus of the subterranean wellbore, wherein the physical fluidic barrier moves to increase a first size of the annulus fluid chamber and decrease a second size of the regulating fluid chamber when an annulus fluid pressure of the annulus fluid within the annulus fluid chamber exceeds the second regulating fluid pressure of the regulating fluid within the regulating fluid chamber by a first threshold value, wherein the physical fluidic barrier moves to decrease the first size of the annulus fluid chamber and increase the second size of the regulating fluid chamber when the regulating fluid pressure of the regulating fluid within the regulating fluid chamber exceeds the annulus fluid pressure of the annulus fluid within the annulus fluid chamber by a second threshold value, wherein increasing the first size of the annulus fluid chamber reduces pressure in the annulus of the subsea wellbore by allowing the annulus fluid to flow from the annulus to the annulus fluid chamber of the accumulator through the piping, and wherein decreasing the first size of the annulus fluid chamber increases pressure in the annulus of the subsea wellbore by allowing the annulus fluid to flow from the annulus fluid chamber of the accumulator to the annulus through the piping.

18. The method of claim 17, further comprising:

installing a sensor device to measure a parameter associated with the annulus fluid.

19. The method of claim 17, further comprising:

installing a valve in line with the piping to control flow of the annulus fluid between the annulus fluid chamber of the accumulator and the annulus.

20. A system for subsea wellbore operations, the system comprising:

a wellbore drilled into a subterranean formation, wherein the wellbore has positioned therein a casing string, a tubing string disposed within the casing string, and an annulus fluid disposed between the tubing string and the casing string;

a subsea wellhead mounted at the entry point of the wellbore;

an accumulator positioned in an environment surrounded by a regulating fluid, wherein the accumulator comprises:

an annulus fluid chamber that contains the annulus fluid having a first pressure at a first time;

a regulating fluid chamber that contains the regulating fluid having a second pressure at the first time;

an inlet that provides fluidic communication of the regulating fluid between the regulating fluid chamber and the environment in which the accumulator is positioned, wherein the inlet allows the second pressure of the regulating fluid within the regulating fluid chamber to be substantially similar to a hydrostatic pressure of the regulating fluid in the environment external to the accumulator during the first time and during subsequent times; and a physical fluidic barrier movably disposed between the annulus fluid chamber and the regulating fluid chamber; and piping having a first end and a second end, wherein the first end penetrates an aperture in the subsea wellhead and terminates in the annulus of the subsea wellbore, and wherein the second end terminates in the annulus fluid chamber of the accumulator, wherein the physical fluidic barrier moves to increase a first size of the annulus fluid chamber and decrease a second size of the regulating fluid chamber at a second time when the first pressure exceeds the second pressure by a first threshold value, wherein the physical fluidic barrier moves to decrease the first size of the annulus fluid chamber and increase the second size of the regulating fluid chamber at the second time when the second pressure exceeds the first pressure by a second threshold value, wherein increasing the first size of the annulus fluid chamber at the second time reduces pressure in the annulus of the subsea wellbore by allowing annulus fluid to flow from the annulus to the annulus fluid chamber through the piping, and wherein decreasing the first size of the annulus fluid chamber at the second time increases pressure in the annulus of the subsea wellbore by allowing annulus fluid to flow from the annulus fluid chamber to the annulus through the piping.

* * * * *